United States Patent
Chu et al.

(10) Patent No.: US 11,722,316 B2
(45) Date of Patent: Aug. 8, 2023

(54) CRYPTOGRAPHIC COMMUNICATION SYSTEM AND CRYPTOGRAPHIC COMMUNICATION METHOD BASED ON BLOCKCHAIN

(71) Applicant: Samsung Electronics Co., Ltd., Suwon-si (KR)

(72) Inventors: Younsung Chu, Yongin-si (KR); Junho Huh, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 116 days.

(21) Appl. No.: 16/923,521

(22) Filed: Jul. 8, 2020

(65) Prior Publication Data
US 2021/0176075 A1    Jun. 10, 2021

(30) Foreign Application Priority Data
Dec. 9, 2019    (KR) .................. 10-2019-0162519

(51) Int. Cl.
*H04L 9/32* (2006.01)
*H04L 9/06* (2006.01)
*H04L 9/00* (2022.01)

(52) U.S. Cl.
CPC .......... *H04L 9/3263* (2013.01); *H04L 9/0643* (2013.01); *H04L 9/3236* (2013.01); *H04L 9/3247* (2013.01); *H04L 9/50* (2022.05)

(58) Field of Classification Search
None
See application file for complete search history.

(56) References Cited

U.S. PATENT DOCUMENTS 9,455,979 B2    9/2016  Blanke
2016/0275461 A1  9/2016  Sprague et al.
(Continued)

FOREIGN PATENT DOCUMENTS

CN    111259439 A  *  6/2020
EP    3413507 A1  * 12/2018    ........... H04L 9/3236
(Continued)

OTHER PUBLICATIONS

Fromknecht et al., "A Decentralized Public Key Infrastructure with Identity Retention", dated Nov. 11, 2014.
(Continued)

*Primary Examiner* — Jeffrey C Pwu
*Assistant Examiner* — Mayasa A. Shaawat
(74) *Attorney, Agent, or Firm* — Harness, Dickey & Pierce, P.L.C.

(57) ABSTRACT

A cryptographic communication system includes an electronic device configured to output a certificate and a transaction including a first hash value in which a certificate is hashed certificate, and a node configured to first determine whether the electronic device generated the transaction based on the transaction and the certificate, to second determine whether information included in the transaction and information included in the certificate coincide, and to third add a block to a distributed ledger depending on the result of the first determining and the second determining. The block includes the transaction, and the electronic device is configured to generate the certificate such that the certificate includes an ID of the electronic device and a public key of the electronic device.

20 Claims, 20 Drawing Sheets

(56) References Cited

U.S. PATENT DOCUMENTS

| | | | |
|---|---|---|---|
| 2017/0302450 A1* | 10/2017 | Ebrahimi | G06F 21/34 |
| 2018/0006826 A1 | 1/2018 | Smith et al. | |
| 2018/0101906 A1 | 4/2018 | McDonald et al. | |
| 2018/0137512 A1* | 5/2018 | Georgiadis | H04L 9/3236 |
| 2018/0183587 A1 | 6/2018 | Won et al. | |
| 2018/0316507 A1* | 11/2018 | Smith | H04L 9/0861 |
| 2019/0173872 A1* | 6/2019 | Arora | G06Q 20/3825 |
| 2019/0182042 A1 | 6/2019 | Ebrahimi et al. | |

FOREIGN PATENT DOCUMENTS

| | | | | |
|---|---|---|---|---|
| KR | 10-1877333 B1 | 8/2018 | | |
| KR | 10-1972110 B1 | 4/2019 | | |
| KR | 10-2019-0063796 A | 6/2019 | | |
| WO | WO-2019161412 A1 * | 8/2019 | | G06Q 20/02 |
| WO | WO-2020036657 A1 * | 2/2020 | | G06Q 20/02 |

OTHER PUBLICATIONS

Bitcoin, "Bitcoin is an innovative payment network and a new kind of money", dated Jul. 3, 2020, https://bitcoin.org/en/.
Namecoin, "Decentralize all the things!", dated Jul. 3, 2020, https://www.namecoin.org.
Bo Quin et al., "Cecoin: A decentralized PKI mitigating MitM attacks", Future Generation Computer Systems, Published by Elsevier B.V., 2017.

* cited by examiner

FIG. 3

- DIDx : Electronic Device x's ID
- PKx : Electronic Device x's Public Key
- SKx : Electronic Device x's Private Key
- HCx : Hash value of Electronic Device x's Certificate
- Mx : DIDx | Command | PKx | HCx
- $\sigma x$ = Sign{SKx, H{Mx}}

- Command
 REG : Register
 UPD : Update
 REV : Revoke

- Format of Mx
 DIDx | REG | PKx | HCx : Register DIDx's public key as PKx
 DIDx | UPD | {PKx$_0$, PKx$_1$} | HCx : Update DIDx's public key from PKx$_0$ to PKx$_1$
 DIDx | REV | PKx | HCx : Revoke transaction about DIDx's public key

FIG. 11

- Message(111b)
  $DID_1$ | UPD | $\{PK_1, PK_{01}\}$ | $HC_{01}$ | $\{\sigma_{01\_1}, \sigma_{01\_2}\}$

- $\sigma_{01\_1}$ = Sign$\{SK_1$, H$\{$Message(111a) | $HC_{01}\}\}$
- $\sigma_{01\_2}$ = Sign$\{SK_{01}$, H$\{$Message(111b)$\}\}$

CRYPTOGRAPHIC COMMUNICATION SYSTEM AND CRYPTOGRAPHIC COMMUNICATION METHOD BASED ON BLOCKCHAIN

CROSS-REFERENCE TO RELATED APPLICATIONS

This application claims priority under 35 U.S.C. § 119 to Korean Patent Application No. 10-2019-0162519 filed on Dec. 9, 2019, in the Korean Intellectual Property Office, the disclosures of which are incorporated by reference herein in their entireties.

BACKGROUND

Example embodiments of inventive concepts disclosed herein relate to a cryptographic communication system, and more particularly, relate to a cryptographic communication system based on a distributed ledger, such as a blockchain.

A public key cryptographic technology is/includes a cryptographic technology using two correlated encryption keys (e.g., a public key and a secret, or private key). A secret/private key may be open/available to only a user possessing the secret/private key, and a public key may be available, e.g. in the open, to anyone wanting the public key. A user may encrypt (respectively, decrypt) a message by using the public key (respectively, private/secret key).

The public key cryptographic technology is used for message encryption and an electronic signature, and requires/utilizes a public key infrastructure (PKI) to secure and manage a public key. The public key infrastructure is/includes a security system for certificate management tasks such as issuing, updating, and revoking public keys. A user in the public key infrastructure may identify himself/herself through a certificate issued by a certification authority (hereinafter referred to as "CA").

Public key infrastructures are/include a centralized system in which authentication and management are made by the CA. In the centralized public key infrastructure, in a case where the root/administration of the CA is attacked, certificates of all users in the public key infrastructure have to be revoked.

SUMMARY

Example embodiments of inventive concepts provide a cryptographic communication system and/or a cryptographic communication method based on blockchain.

According to some example embodiments, a cryptographic communication system may include includes an electronic device configured to output a certificate and a transaction including a first hash value in which a certificate is hashed certificate, and a node configured to first determine whether the electronic device generated the transaction based on the transaction and the certificate, to second determine whether information included in the transaction and information included in the certificate coincide, and to third add a block to a distributed ledger depending on the result of the first determining and the second determining. The block includes the transaction, and the electronic device is configured to generate the certificate such that the certificate includes an ID of the electronic device and a public key of the electronic device.

According to some example embodiments, an electronic device may include An interface, processing circuitry, and a memory configured to store instructions executable by the processor. The instructions, when executed by the processing circuitry, cause the processing circuitry to, generate a first certificate including an ID and a public key, the ID and the public key being associated with the electronic device, generate a first transaction including a hash value of a hash of the first certificate, output the first certificate and the first transaction to a distributed ledger through the interface, obtain a second transaction including an identity of an external electronic device from the distributed ledger in response to a second certificate indicating the external electronic device received the identity of the external electronic device, and verify the identity of the external electronic device based on the second certificate and the second transaction.

According to some example embodiments, a cryptographic communication method may include receiving a first certificate of a first electronic device and a first transaction including a first hash value in which the first certificate is hashed, comparing a first result value corresponding to a decryption of a portion of the first transaction based on a first public key included in the first transaction with a second hash value of a hashing of the first certificate received from the first electronic device, comparing information included in the first transaction with information included in the first certificate, and registering the first transaction at a distributed ledger in response to the first result value and the second hash value coinciding, and the information included in the first transaction and the information included in the first certificate coinciding.

BRIEF DESCRIPTION OF THE FIGURES

The above and other objects and features of inventive concepts will become apparent by describing in detail example embodiments thereof with reference to the accompanying drawings.

FIG. 3 is a diagram for describing functions disclosed in the specification.

FIG. 11 is a diagram for describing a signature of a transaction of FIG. 9.

DETAILED DESCRIPTION OF EXAMPLE EMBODIMENTS

Below, some example embodiments of inventive concepts may be described in detail and clearly to such an extent that an ordinary one in the art easily implements inventive concepts.

Inventive concepts may provide a cryptographic communication system and/or a cryptographic communication method based on blockchain.

As used herein, a "blockchain" may mean and/or correspond to a distributed ledger technology that allows nodes in a network to record and manage a ledger, e.g. a common ledger, recording transaction information. The distributed ledger may mean that a ledger is distributed into a peer-to-peer (P2P) network, and is not at a central server of a specific authority. All nodes in the P2P network may provide resources such as processing capability, storage space, data, network bandwidth, etc., to each other without interference of and/or communication with a central node. There may be some mechanism, such as a proof-of-work and/or a proof-of-stake mechanism, wherein nodes of the P2P network securely update the distributed blockchain network; however, example embodiments are not limited thereto.

In general, a "blockchain wallet" may mean and/or correspond to a mechanism that stores a value in an electronic device by an electronic method and enables online and/or offline transactions without an exchange of a commodity money. In particular, the "blockchain wallet" mentioned herein may be and/or correspond to and/or include a program that is used to generate a transaction and a certificate, the certificate being based on a public key and/or a private key, etc. The blockchain wallet may be implemented through software including program codes and/or may be implemented through hardware storing program codes.

As used herein, a "hash" may mean and/or correspond to a function mapping data of any length onto data of a fixed length. A "hash value" may mean a value that is obtained by a hash function.

As used herein, an "electronic device" may mean and/or correspond and/or include a device that is supplied with electric energy and operates. For example, an electronic device may be or include, but is not limited to, a smartphone, a tablet personal computer (PC), a smart TV, a mobile phone, a personal digital assistant (PDA), a laptop, a stationary computing device, etc.

As used herein, a "node" may mean and/or correspond to and/or include a component in a blockchain network. For example, the node may be or include, but is not limited to, a special-purpose computer, a general-purpose computer, a supercomputer, a mainframe computer, a personal computer, a smartphone, a tablet PC, etc.

Figure 1:
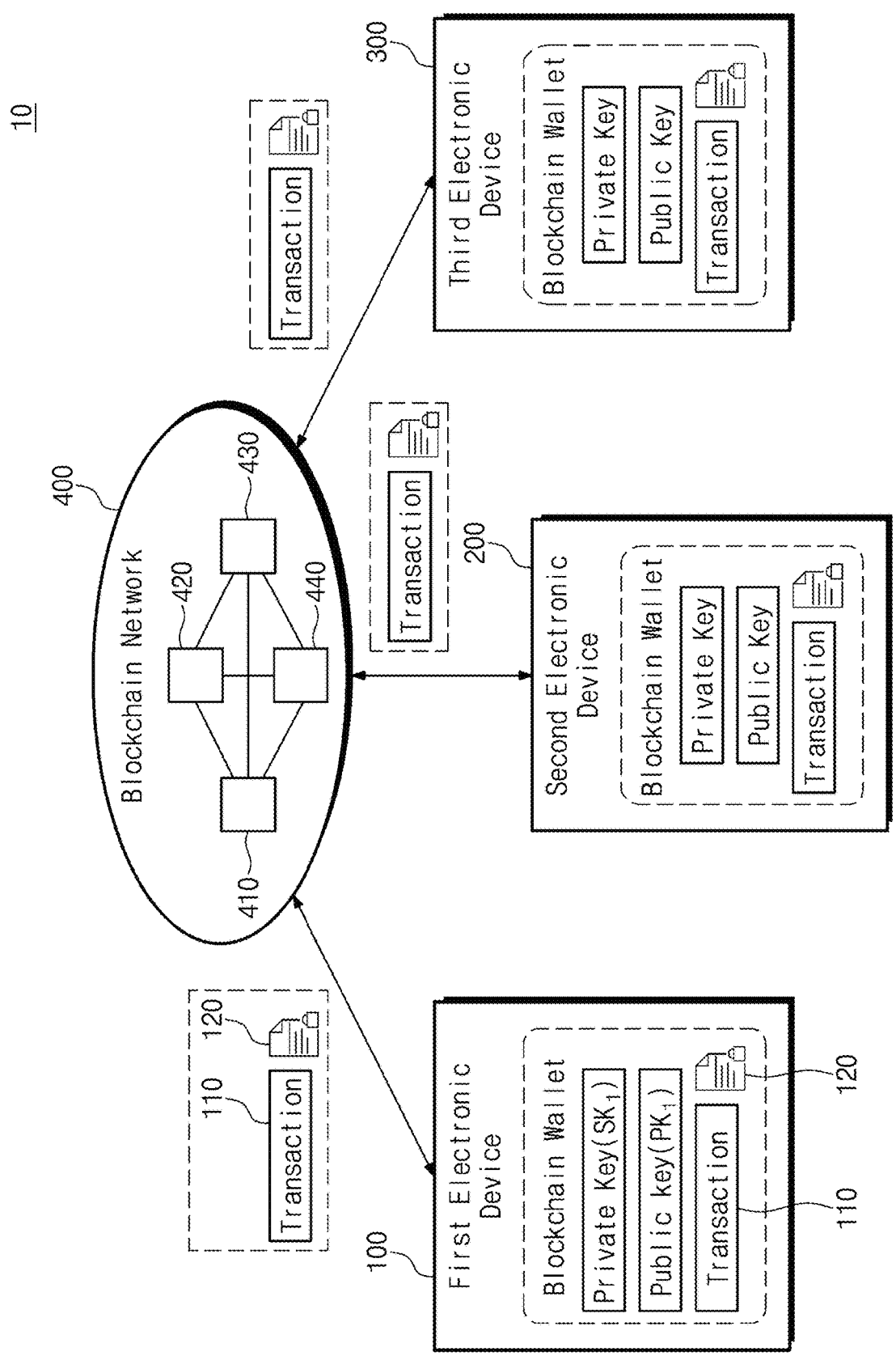
FIG. 1 is a conceptual diagram for describing a cryptographic communication system according to some example embodiments of inventive concepts.

FIG. 1 is a conceptual diagram for describing a cryptographic communication system according to some example embodiments of inventive concepts.

Based on a blockchain, a cryptographic communication system 10 may verify electronic devices 100, 200, and 300, and may verify transactions between the electronic devices 100, 200, and 300. The cryptographic communication system 10 may include the first electronic device 100, the second electronic device 200, the third electronic device 300, and a blockchain network 400. Below, for convenience of description, nodes 410 to 440 of the blockchain network 400 and the electronic devices 100 to 300 are illustrated to be independent of each other, but the electronic devices 100 to 300 may provide the same or substantially the same operations as the nodes 410 to 440. For example, the electronic devices 100 to 300 may also operate as a client of the blockchain network 400 like the nodes 410 to 440.

The electronic devices 100, 200, and 300 may provide the same or substantially the same operations. Accordingly, in the following descriptions, operations of the first electronic device 100 will be mainly described.

The first electronic device 100 may execute a blockchain wallet. The first electronic device 100 may generate a private key $SK_1$, a public key $PK_1$, a transaction 110, and a certificate 120, by using/based on the blockchain wallet. The private key $SK_1$ may be known only to the first electronic device 100 and may not be known or publicly accessible to other external components such as electronic devices 200, 300, and 410 to 440. The public key $PK_1$ may be known to/accessible by all the components/electronic devices 200, 300, and 410 to 440 in the cryptographic communication system 10.

The first electronic device 100 may encrypt a message by using the private key $SK_1$. The remaining components 200, 300, and 410 to 440 may decrypt the encrypted message by using the public key $PK_1$. Encrypting a message with the private key $SK_1$ may mean or correspond to signing the message with the private key $SK_1$. A method in which the first electronic device 100 encrypts a message may be at least one of a Diffie-Hellman key exchange method, a RSA method, a Rabin method, an ElGamal method, a DSA method, and/or an elliptic-curve method. However, example embodiments are not limited thereto. For example, the first electronic device 100 may encrypt a message by using any other method other than methods described herein, such as post-quantum encryption method.

The transaction 110 may be, include, or correspond to a character string in which there is contained information of a transaction, e.g. an update transaction, that the first electronic device 100 requests from the blockchain network 400. The transaction 110 may include information about an identity of the first electronic device 100 and a command that the first electronic device 100 requests from/of the blockchain network 400. The transaction 110 will be more fully described with reference to FIG. 2.

The certificate 120 may be, include, or correspond to a document and/or string indicating the identity of the first electronic device 100. The certificate 120 may include at least the following information: an ID of the first electronic device 100 and the public key $PK_1$ of the first electronic device 100. The certificate 120 will be more fully described with reference to FIG. 5.

The first electronic device 100 may output the transaction 110 and the certificate 120 to the blockchain network 400, e.g. may output the transaction 110 and the certificate 120 over a P2P network corresponding to the blockchain network 400.

The blockchain network 400 may receive the transaction 110 and the certificate 120 output from the first electronic device 100. The blockchain network 400 may include the nodes 410 to 440. The node 410 may perform a verification operation on the transaction 110 and the certificate 120. However, example embodiments are not limited thereto. For example, at least one of the remaining nodes 420 to 440 may perform an operation of verifying a transaction and a certificate. For example, the operation of verifying the transaction 110 and the certificate 120 may include an operation of determining whether the transaction 110 and the certificate 120 are generated from the first electronic device 100, and an operation of determining whether information about the first electronic device 100 included in the certificate 120 and information about the first electronic device 100 included in the transaction 110 coincide.

After the transaction 110 and the certificate 120 have been fully verified, the node 410 may generate a block including the transaction 110. The node 410 may output the generated block to the remaining nodes 420 to 440, for example over the P2P network. In this case, the generated block may be recorded at a distributed ledger on the blockchain network 400. For example, the transaction 110 may be registered at the distributed ledger on the blockchain network 400.

Figure 2:
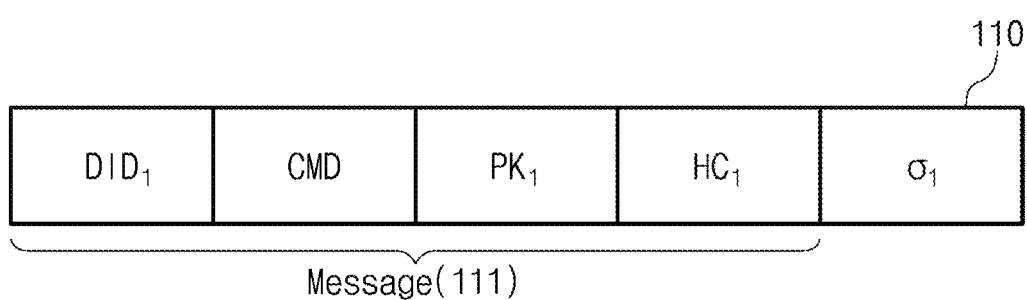
FIG. 2 is a conceptual diagram for describing a transaction of FIG. 1.

FIG. 2 is a conceptual diagram for describing a transaction of FIG. 1.

The transaction 110 may include a message 111 (e.g. a payload) and a signature $\sigma_1$.

The message 111 may include an identification, e.g. an ID $DID_1$ of the first electronic device 100 of FIG. 1, a command CMD that the first electronic device 100 requests from the node 410, the public key $PK_1$ of the first electronic device 100, and a hash value $HC_1$ being a result of hashing the certificate 120 of FIG. 1. Inventive concepts may use, but is not limited to, a secure hash function such as the SHA256 hash function. The ID $DID_1$ of the first electronic device 100, the command CMD, the public key $PK_1$, and the hash value $HC_1$ included in the transaction 110 may be listed in a different order from the order illustrated in FIG. 2.

The signature $\sigma_1$ may be a result of encrypting the message 111 by using the private key $SK_1$ of FIG. 1. For example, the signature $\sigma_1$ may be a result of encrypting a hash value by using the private key $SK_1$, wherein the hash value corresponds to a hash of the message 111.

The node 410 of FIG. 1 may perform a verification operation on the transaction 110 and the certificate 120 before performing an operation corresponding to the command CMD. For example, the node 410 may determine whether information included in the transaction 110 and information included in the certificate 120 coincide, by using the message 111. The node 410 may determine whether the transaction 110 and the certificate 120 are generated from the first electronic device 100, by using the signature $\sigma_1$. An operation of the node 410 will be more fully described with reference to FIG. 6.

FIG. 3 is a diagram for describing functions disclosed in the specification.

Referring to FIG. 3, "DIDx" indicates an ID of an electronic device "x". The electronic device "x" may be or correspond to one of the electronic devices 100 to 300 of FIG. 1. "PKx" indicates a public key of the electronic device "x". "SKx" indicates a private key of the electronic device "x". "HCx" indicates a hash value being a result of hashing a certificate of the electronic device "x". "Mx" indicates a message generated from the electronic device "x". As described with reference to FIG. 2, "Mx" may be a bit string in which "DIDx", "PKx", "SKx", and "HCx" are listed. "ax" indicates a signature generated from the electronic device "x". As described with reference to FIG. 2, "ax" may be a result of encrypting a hash value being a result of hashing "Mx" by using a private key.

A command may include "REG", "UPD", and "REV", and may correspond to commands to be performed within the blockchain 400 of FIG. 1. However, inventive concepts are not limited thereto. For example, a command, which is not disclosed in FIG. 3, such as "Look up" may be used. The "Look up" command will be more fully described with reference to FIGS. 19 and 20.

The electronic device "x" may use the "REG" command when intending to register identity information of the electronic device "x" at or within a distributed ledger such as the blockchain 400 of FIG. 1. In a case of using the "REG" command, the electronic device "x" may generate a message Mx including "DIDx", "REG", "PKx", and/or "HCx". The electronic device "x" may request the node 410 of FIG. 1 to register a public key of the electronic device "x" at the distributed ledger as "PKx", by using the message Mx.

The electronic device "x" may use the "UPD" command when intending to update the identity information of the electronic device "x" registered at or within the distributed ledger. In a case of using the "UPD" command, the electronic device "x" may generate a message Mx including "DIDx", "REG", "$\{PKx_0, PKx_1\}$", and "HCx". The electronic device "x" may request the node 410 to update a public key of the "DIDx" registered at the distributed ledger from "$PKx_0$" to "$PKx_1$", by using the message Mx. For example, after the electronic device "x" updates the public key of the "DIDx" registered at the distributed ledger from "$PKx_0$" to "$PKx_1$", in a case where the electronic device "x" again updates the public key of the "DIDx" registered at the distributed ledger from "$PKx_1$" to "$PKx_2$", the electronic device "x" may generate a message Mx including "DIDx", "REG", "$\{PKx_0, PKx_2\}$", and "HCx". For example, the message Mx may be generated to include information about the public key $PKx_0$ registered for the first time and information about the public key $PKx_2$ to be registered at a distributed ledger. When a transaction and a certificate of the electronic device "x" are completely verified, the node 410 may generate a block including the message Mx and may register the block at the distributed ledger.

The electronic device "x" may use the "REV" command when intending to revoke the identity information of the electronic device "x" registered at the distributed ledger. In a case of using the "REV" command, the electronic device "x" may generate a message Mx including "DIDx", "REV", "PKx", and "HCx". The electronic device "x" may request the node 410 to revoke the public key of the "DIDx" registered at the distributed ledger, by using the message Mx.

Figure 4:
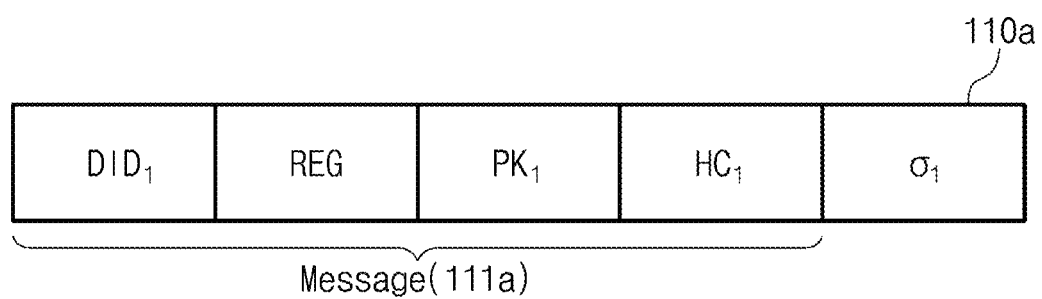
FIG. 4 is a conceptual diagram illustrating some example embodiments of a transaction of FIG. 1.

FIG. 4 is a conceptual diagram illustrating some example embodiments of a transaction of FIG. 1.

The first electronic device 100 of FIG. 1 may generate a transaction 110a when intending to register identity information of the first electronic device 100 at a distributed ledger. The transaction 110a may include a message 111a (e.g. a payload) and a signature $\sigma_1$. The message 111a may include "$DID_1$", "REG", "$PK_1$", and "$HC_1$". "$DID_1$", "$PK_1$", and "$HC_1$" indicate an ID of the first electronic device 100, a public key of the first electronic device 100, and a hash value being a result of hashing the certificate 120 of the first electronic device 100, respectively. The signature $\sigma_1$ may be a result of encrypting a hash value by using the private key $SK_1$ with the hash value being a result of hashing the message 111a.

Figure 5:
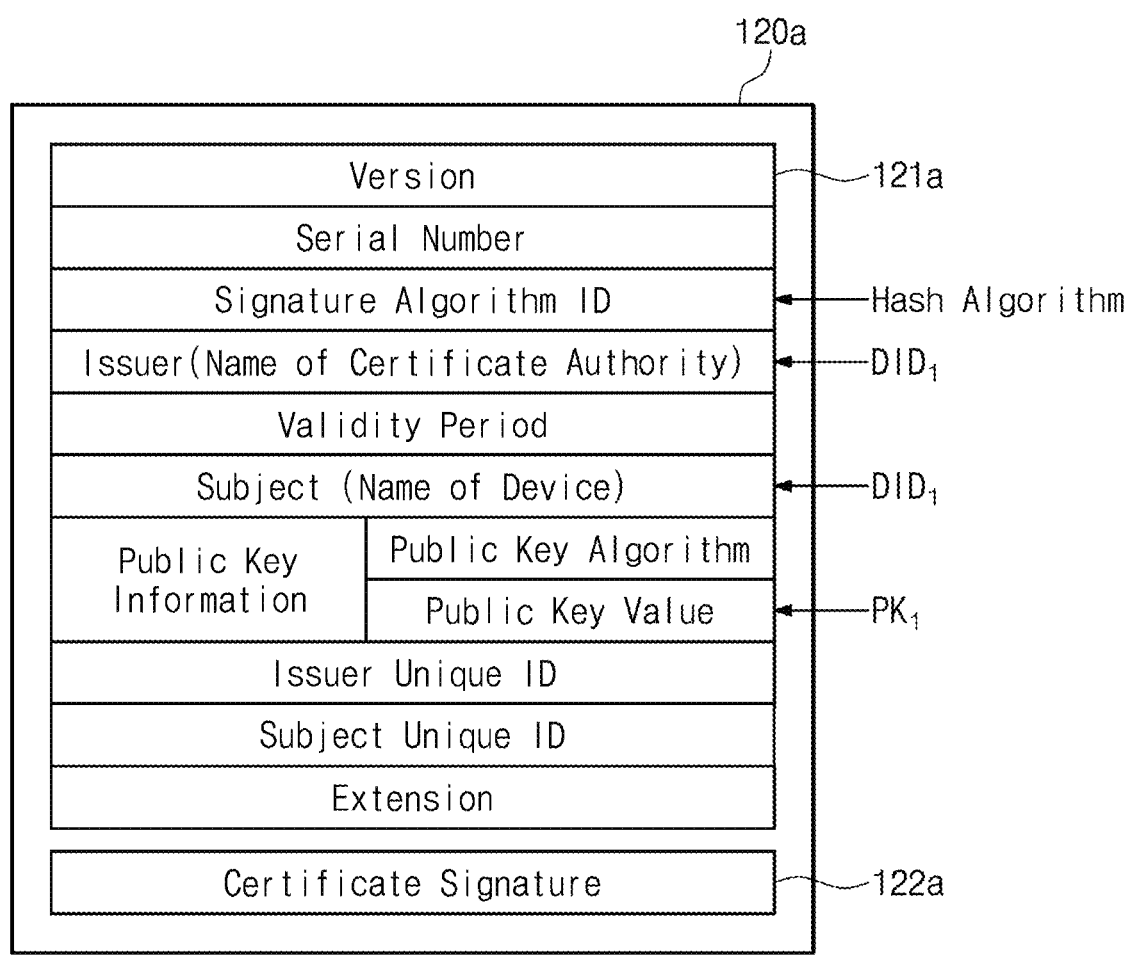
FIG. 5 is a block diagram illustrating some example embodiments of a certificate of FIG. 1.

FIG. 5 is a block diagram illustrating some example embodiments of the certificate of FIG. 1.

The first electronic device 100 of FIG. 1 may generate a certificate 120a for the purpose of proving the first electronic device 100's own identity to the blockchain network 400 of FIG. 1. The first electronic device 100 may generate the certificate 120a complying with the X.509 certificate format. X.509 is an ITU-T standard, which is based on a public key (KPI), from among standards of a public key certificate and an authentication algorithm. The X.509 certificate may indicate a PKI certificate of the IETF (Internet Engineering Task Force) and a CRI (Client Responsible Individual) profile of an X.509 v.3 certificate standard and may be defined in [RFC 3280]. However, inventive concepts are not limited thereto. For example, the first electronic device 100 may generate a certificate that complies with standards of another authentication algorithm/a conventional authentication algorithm.

Each field of the certificate 120a complying with the X.509 certificate format is described with reference to FIG. 5.

A version field indicates a version of a certificate.

A serial number field indicates a unique serial number of a certificate, which the certification authority (CA) specifies. Because the CA does not exist in the cryptographic communication system 10 of inventive concepts, the serial number field of the certificate 120a may indicate a number that the first electronic device 100 randomly generates. Alternatively and/or additionally, the serial number field of the certificate 120a may be filled with random and/or meaningless information, and/or may be reserved for future use.

A signature algorithm ID field may indicate an algorithm and an algorithm identifier that the CA uses when signing a certificate. The signature algorithm ID field of the certificate 120a may indicate a hash algorithm and/or a hash function that the first electronic device 100 uses. For example, the first electronic device 100 may use an ECDSA (Elliptic Curve Digital Signature Algorithm) and/or an SHA-256 algorithm. In this case, the signature algorithm ID field of the certificate 120a may indicate the ECDSA and/or the SHA-256 algorithm.

An issuer field may indicate information about the certification authority (CA) that issues a certificate. Because an issuer of the certificate 120a is the first electronic device 100, the issuer field of the certificate 120a may indicate the ID $DID_1$ of the first electronic device 100.

A validity period field may indicate a start date and an end date of a validity period, e.g. a period of time corresponding to the validity of the digital certificate 120a.

A subject field may indicate a name of a certificate owner. For example, the subject field of the certificate 120a may indicate the ID $DID_1$ of the first electronic device 100.

A public key information field may include a public key algorithm field and a public key value field. The public key value field of the certificate 120a may indicate the public key $PK_1$ of the first electronic device 100.

An issuer unique ID field and a subject unique ID field may indicate an ID of a certification authority and the ID $DID_1$ of the first electronic device 100, respectively. The fields may be selectively included in the certificate 120a. Because a certification authority does not exist in the cryptographic communication system 10 of inventive concepts, the issuer unique ID field of the certificate 120a may include a random and/or meaningless bit string, and/or may be reserved for future use.

The first electronic device 100 may additionally include private information in an extension field of the certificate 120a.

A certificate signature field may indicate a certificate signature 122a. The certificate signature 122a may correspond to a result of encrypting a hash value by using the private key $SK_1$ with the hash value being a result of hashing identity information 121a included in the certificate 120a.

For example, the first electronic device 100 may fill fields associated with a certification authority from among the fields of the X.509 certificate with information about the first electronic device 100. The first electronic device 100 may generate the certificate 120a complying with the X.509 certificate format. This may mean or may indicate that the first electronic device 100 is capable of being used in an X.509 system.

Figure 6:
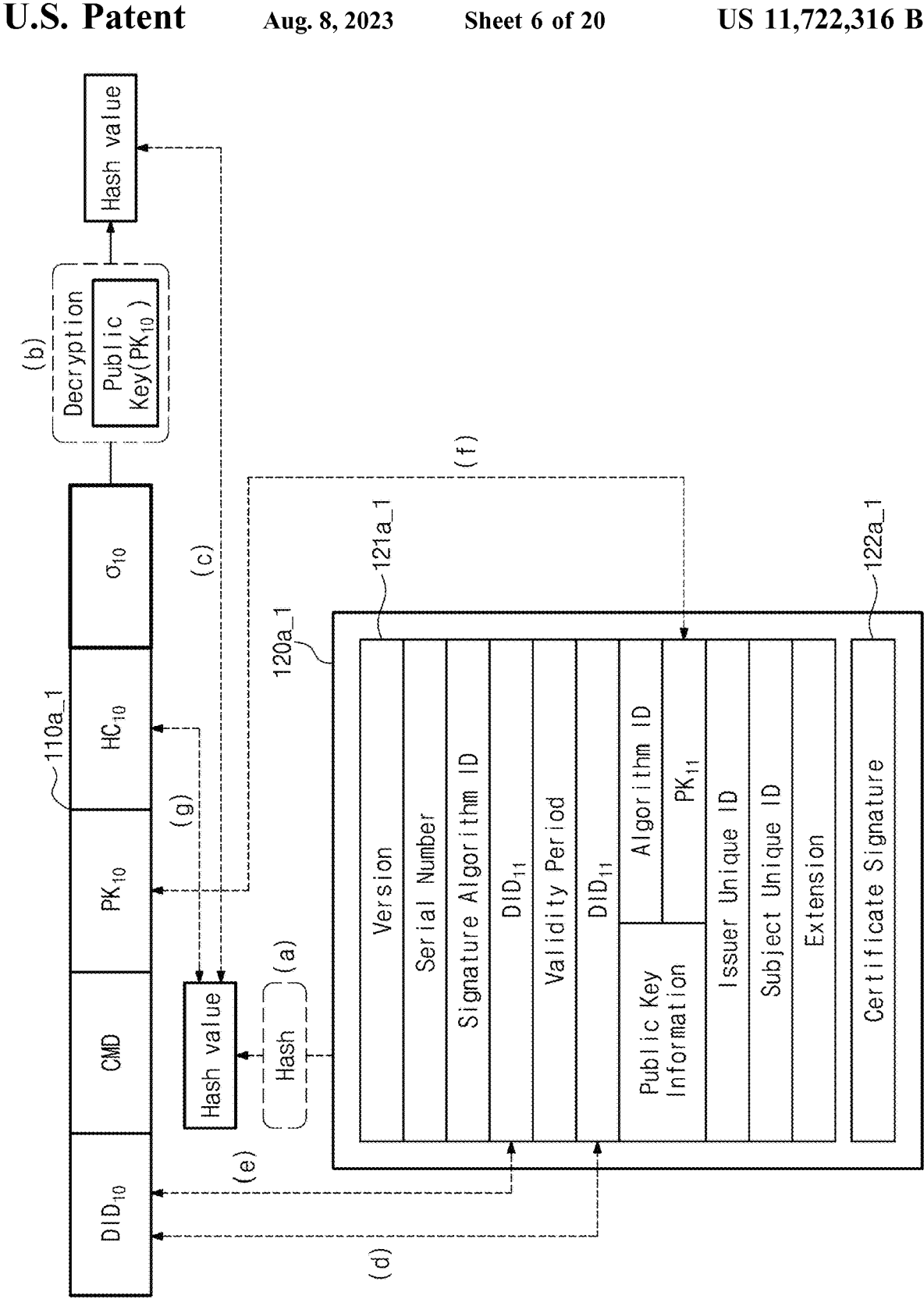
FIG. 6 is a conceptual diagram for describing a method in which a node of FIG. 1 verifies a transaction and a certificate.

FIG. 6 is a conceptual diagram for describing a method in which a node of FIG. 1 verifies a transaction and a certificate.

The first electronic device 100 of FIG. 1 may output the transaction 110a of FIG. 4 and the certificate 120a of FIG. 5 in a case of intending to register the first electronic device 100's own identity information at a distributed ledger.

The node 410 of FIG. 1 may receive a transaction 110a_1 and a certificate 120a_1 from the first electronic device 100. In a case where the transaction 110a and the certificate 120a are transmitted from the first electronic device 100 to the node 410 without an attack, the transaction 110a_1 and the certificate 120a_1 may be identical to the transaction 110a and the certificate 120a. For example, in this case, "$DID_{10}$", "$PK_{10}$", "$HC_{10}$", and "$\sigma_{10}$" may be identical to "$DID_1$", "$PK_1$", "$HC_1$", and "$\sigma_1$" of FIG. 4. Also, "$DID_{11}$" and "$PK_{11}$" may be identical to "$DID_1$" and "$PK_1$" of FIG. 5.

The node 410 may perform a verification operation on the transaction 110a_1 and the certificate 120a_1. The verification operation associated with the transaction 110a_1 and the certificate 120a_1 may include an operation of determining whether the transaction 110a_1 and the certificate 120a_1 are generated from the first electronic device 100, and an operation of determining whether information of the transaction 110a_1 and information of the certificate 120a_1 coincide. The operation of determining whether the transaction 110a_1 and the certificate 120a_1 are generated from the first electronic device 100 may mean or correspond to an operation of determining whether the transaction 110a and the certificate 120a are or have been attacked/corrupted by an attacker while being transferred from the first electronic device 100 to the node 410.

When the verification succeeds, the node 410 may generate a block including the transaction 110a_1. When the verification fails, the node 410 may revoke the transaction 110a_1 and the certificate 120a_1 received from the first electronic device 100. In the following descriptions, "verification success" may mean or correspond to the transaction 110a_1 and the certificate 120a_1 being generated from the first electronic device 100 and the information of the transaction 110a_1 and the information of the certificate 120a_1 coinciding. Also, "verification fail" may mean or correspond to the transaction 110a_1 and the certificate 120a_1 not being generated from the first electronic device 100, and/or the information of the transaction 110a_1 and the information of the certificate 120a_1 not coinciding.

An operation in which the node 410 determines whether the transaction 110a_1 and the certificate 120a_1 are generated from the first electronic device 100 is described with reference to operation (a) to operation (c) of FIG. 6. In operation (a), the node 410 may generate a hash value of the certificate 120a_1. In operation (b), the node 410 may generate a hash value by decrypting the signature $\sigma_{10}$ of the transaction 110a_1, the decryption being by using the public key $PK_{10}$. To perform operation (b), the node 410 may obtain the public key $PK_{10}$ from the transaction 110a_1.

The node 410 may compare the hash value generated in operation (a) with the hash value generated in operation (b). That the hash value generated in operation (a) and the hash value generated in operation (b) coincide may mean, indicate, or correspond to the transaction 110a_1 and the certificate 120a_1 being generated from the first electronic device 100. That the hash value generated in operation (a) and the hash value generated in operation (b) do not coincide may mean, indicate, or correspond to the transaction 110a_1 and the certificate 120a_1 not being generated from the first electronic device 100.

When the node 410 determines that the transaction 110a_1 is generated from the first electronic device 100, the node 410 may determine whether the information of the transaction 110a_1 and the information of the certificate 120a_1 coincide, through operation (a) and operation (d) to operation (g).

In operation (d) and operation (e), the node 410 may determine whether an ID $DID_{10}$ and an ID $DID_{11}$ coincide, by comparing the ID $DID_{10}$ of the transaction 110a_1 with the ID $DID_{11}$ of the certificate 120a_1. In detail, operation (d) may be or include an operation of comparing the ID $DID_{10}$ of the transaction 110a_1 and the ID $DID_{11}$ included in the issuer field of the certificate 120a_1. Operation (e) may be or include an operation of comparing the ID $DID_{10}$ of the transaction 110a_1 and the ID $DID_{11}$ included in the subject field of the certificate 120a_1. The node 410 may selectively perform one of operation (d) or operation (e) or may perform both operation (d) and operation (e).

In operation (f), the node 410 may determine whether a public key $PK_{10}$ and a public key $PK_{11}$ coincide, by comparing the public key $PK_{10}$ of the transaction 110a_1 and the public key $PK_{11}$ of the certificate 120a_1.

In operation (g), the node 410 may determine whether a hash value $HC_{10}$ included in the transaction 110a_1 and the hash value generated in operation (a) coincide, by comparing the hash value $HC_{10}$ and the hash value generated in operation (a).

When is the node 410 determine through operation (a) and operation (d) to operation (g) that the information of the transaction 110a_1 and the information of the certificate 120a_1 coincide, the node 410 may generate a block including the transaction 110a_1. The node 410 may broadcast the block on the P2P network, and may broadcast other information such as a proof-of-work; however, example embodiments are not limited thereto.

The order of operation (a) to operation (g) is not limited to the above description. The first electronic device 100 may perform operation (a) to operation (g) in any order. However, operation (a) may be performed before operation (c) and operation (g) are performed.

Figure 7:
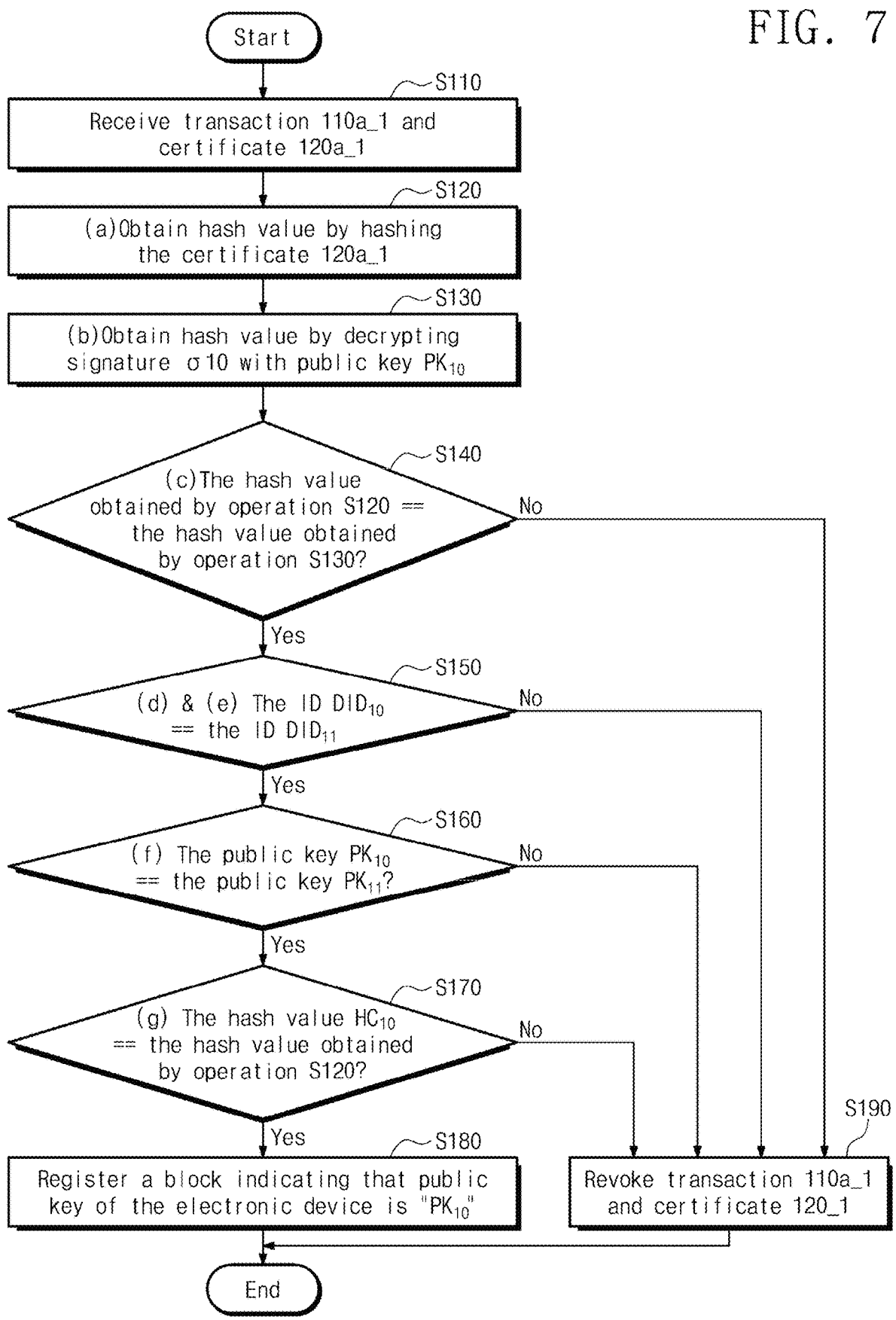
FIG. 7 is a flowchart for describing a method in which a node of FIG. 1 verifies a transaction and a certificate.

FIG. 7 is a flowchart for describing a method in which a node of FIG. 1 verifies a transaction and a certificate.

The node 410 of FIG. 1 may perform operation S110 to operation S190 for the purpose of verifying the transaction 110a_1 and the certificate 120a_1 of FIG. 6. Because operation S110 to operation S190 are substantially identical to operation (a) to operation (g) described with reference to FIG. 6, operation S110 to operation S190 are briefly described.

In operation S110, the node 410 may receive the transaction 110a_1 and the certificate 120a_1 from the first electronic device 100 of FIG. 1.

In operation S120, the node 410 may obtain/calculate a hash value of the certificate 120a_1. Operation S120 may correspond to operation (a) of FIG. 6.

In operation S130, the node 410 may obtain a hash value by decrypting the signature $\sigma_{10}$ by using the public key $PK_{10}$. Operation S130 may correspond to operation (b) of FIG. 6.

In operation S140, the node 410 may compare the hash value obtained in operation S120 and the hash value obtained in operation S130. Operation S140 may correspond to operation (c) of FIG. 6.

When the hash value obtained in operation S120 and the hash value obtained in operation S130 do not coincide, the node 410 may perform operation S190. When the hash value obtained in operation S120 and the hash value obtained in operation S130 do not coincide, there may be an indication that an attacker has attacked/corrupted the transaction 110a_1 and/or the certificate 120a_1 In operation S190, the node 410 may revoke the transaction 110a_1 and the certificate 120a_1 received from the first electronic device 100 of FIG. 1.

When the hash value obtained in operation S120 and the hash value obtained in operation S130 coincide, the node 410 may perform operation S150. In operation S150, the node 410 may compare the ID $DID_{10}$ included in the transaction 110a_1 and an ID $DID_{11}$ included in the certificate 120a_1. Operation S140 may correspond to operation (d) and operation (e) of FIG. 6.

When the ID $DID_{10}$ included in the transaction 110a_1 and the ID $DID_{11}$ included in the certificate 120a_1 do not coincide, the node 410 may perform operation S190.

When the ID $DID_{10}$ included in the transaction 110a_1 and the ID $DID_{11}$ included in the certificate 120a_1 coincide, the node 410 may perform operation S160. In operation S160, the node 410 may compare the public key $PK_{10}$ included in the transaction 110a_1 and the public key $PK_{11}$ included in the certificate 120a_1. Operation S160 may correspond to operation (f) of FIG. 6.

When the public key $PK_{10}$ included in the transaction 110a_1 and the public key $PK_{11}$ included in the certificate 120a_1 do not coincide, the node 410 may perform operation S190.

When the public key $PK_{10}$ included in the transaction 110a_1 and the public key $PK_{11}$ included in the certificate 120a_1 coincide, the node 410 may perform operation S170. In operation S170, the node 410 may compare the hash value $HC_{10}$ included in the transaction 110a_1 and the hash value obtained in operation S120. Operation S170 may correspond to operation (g) of FIG. 6.

When the hash value $HC_{10}$ included in the transaction 110a_1 and the hash value obtained in operation S120 do not coincide, the node 410 may perform operation S190.

When the hash value $HC_{10}$ included in the transaction 110a_1 and the hash value obtained in operation S120 coincide, the node 410 may perform operation S180. In operation S180, the node 410 may generate a block including the transaction 110a_1. The node 410 may register the generated block at the distributed ledger, for example by broadcasting the block on the P2P network, or broadcasting the block and a proof-of-work on the P2P network. For example, a block indicating that a public key of the first electronic device 100 having the ID $DID_{10}$ is "$PK_{10}$" may be registered at the distributed ledger.

Figure 8:
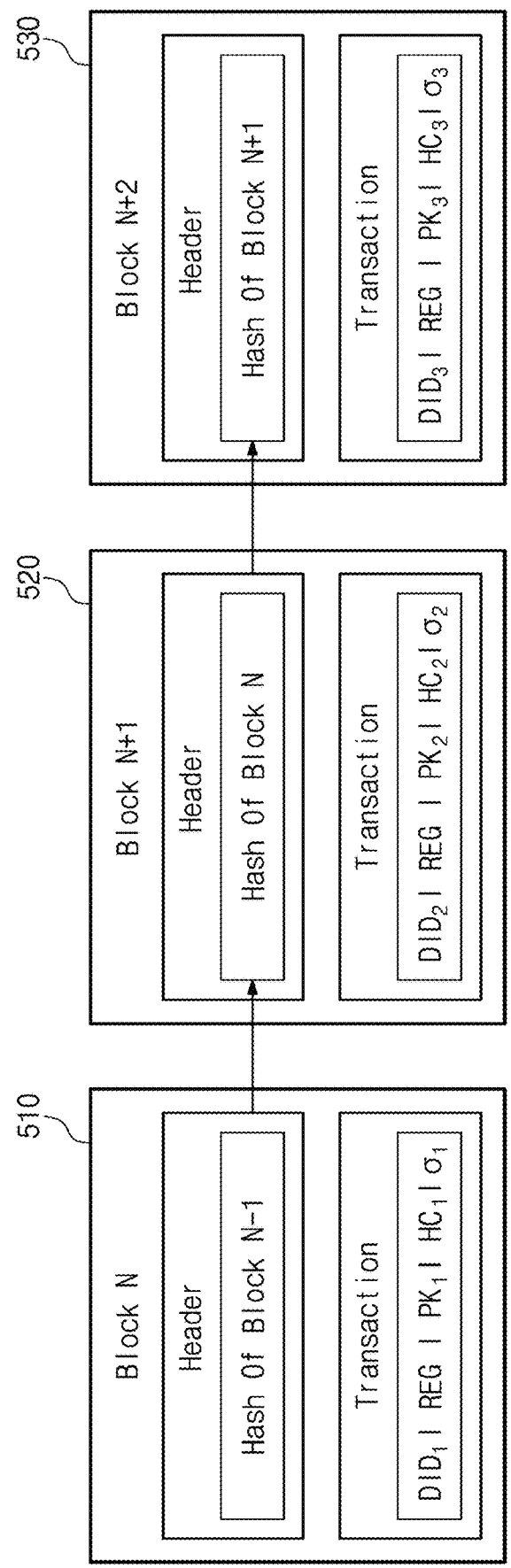
FIG. 8 is a conceptual diagram for indicating blocks registered at a distributed ledger on a blockchain network of FIG. 1.

FIG. 8 is a conceptual diagram for indicating blocks registered at a distributed ledger on a blockchain network of FIG. 1.

FIG. 8 illustrates how blocks 510 to 530 respectively indicating identity information of the electronic devices 100 to 300 of FIG. 1 are sequentially registered at/on the distributed ledger through verification of the transaction 110 for a public key and ID register/update/revoke/extension request and the self-signed certificate 120.

The block 510 may indicate that a public key of the first electronic device 100 having the ID $DID_1$ is "$PK_1$". The block 520 may indicate that a public key of the second electronic device 200 having an ID $DID_2$ is "$PK_2$". The block 530 may indicate that a public key of the third electronic device 300 having an ID $DID_3$ is "$PK_3$".

Accordingly, the distributed ledger where the blocks 510 to 530 are registered may secure the following: a public key of the first electronic device 100 having the ID $DID_1$ is "$PK_1$", a public key of the second electronic device 200 having the ID $DID_2$ is "$PK_2$", and a public key of the third electronic device 300 having an ID $DID_3$ is "$PK_3$".

There may be other information included in each of the blocks 510 to 530; however, example embodiments are not limited thereto. For example, there may include a proof-of-work included in each of the blocks 510 to 530; however, example embodiments are not limited thereto. Furthermore, the transaction data may be organized as a tree, for example as Merkle tree; however, example embodiments are not limited thereto.

Figure 9:
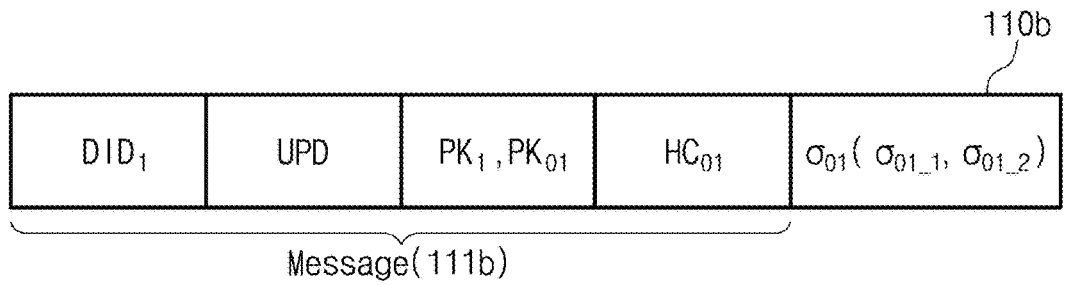
FIG. 9 is a conceptual diagram illustrating some example embodiments of a transaction of FIG. 1.

FIG. 9 is a conceptual diagram illustrating some example embodiments of a transaction of FIG. 1.

The first electronic device 100 of FIG. 1 may generate a new private key and a new public key $PK_{O1}$ corresponding to the new private key. The first electronic device 100 of FIG. 1 may generate a new certificate along with a transaction 110b, for the purpose of registering the newly generated public key $PK_{O1}$ at a distributed ledger. For example, the first electronic device 100 of FIG. 1 may generate a new certificate and the transaction 110b for the purpose of updating identity information of the first electronic device 100 registered at the distributed ledger. The new certificate will be more fully described with reference to FIG. 10.

The transaction 110b may include a message 111b and a signature $\sigma_{O1}$. The message 111b may include "$DID_1$", "UPD", "$\{PK_1, PK_{O1}\}$", and "$HC_{O1}$". Herein "$DID_1$", "$PK_1$", "$PK_{O1}$", and "$HC_{O1}$" indicate an ID of the first electronic device 100, a public key of the first electronic device 100 registered at the distributed ledger, a public key of the first electronic device 100 to be registered at the distributed ledger, and a hash value being a result of hashing a new certificate of the first electronic device 100, respectively.

The signature $\sigma_{O1}$ may be or include a signature $\sigma_{O1\_1}$ and a signature $\sigma_{O1\_2}$. The signature $\sigma_{O1\_1}$ may be or include a result of encrypting a hash value of hashing the message 111a registered at the distributed ledger and a hash value $HC_{O1}$ of the message 111b, with the encryption being by using the private key $SK_1$. The message 111a may be or include a message indicating a current identity of the first electronic device 100 from among messages registered at the distributed ledger. The private key $SK_1$ may be or include a private key that has been used to generate the message 111a. The signature $\sigma_{O1\_2}$ may be a result of encrypting a hash value of hashing the message 111b, with the encryption being by using the new private key. Functional formulas of the signature $\sigma_{O1\_1}$ and the signature $\sigma_{O1\_2}$ are illustrated in FIG. 11.

Figure 10:
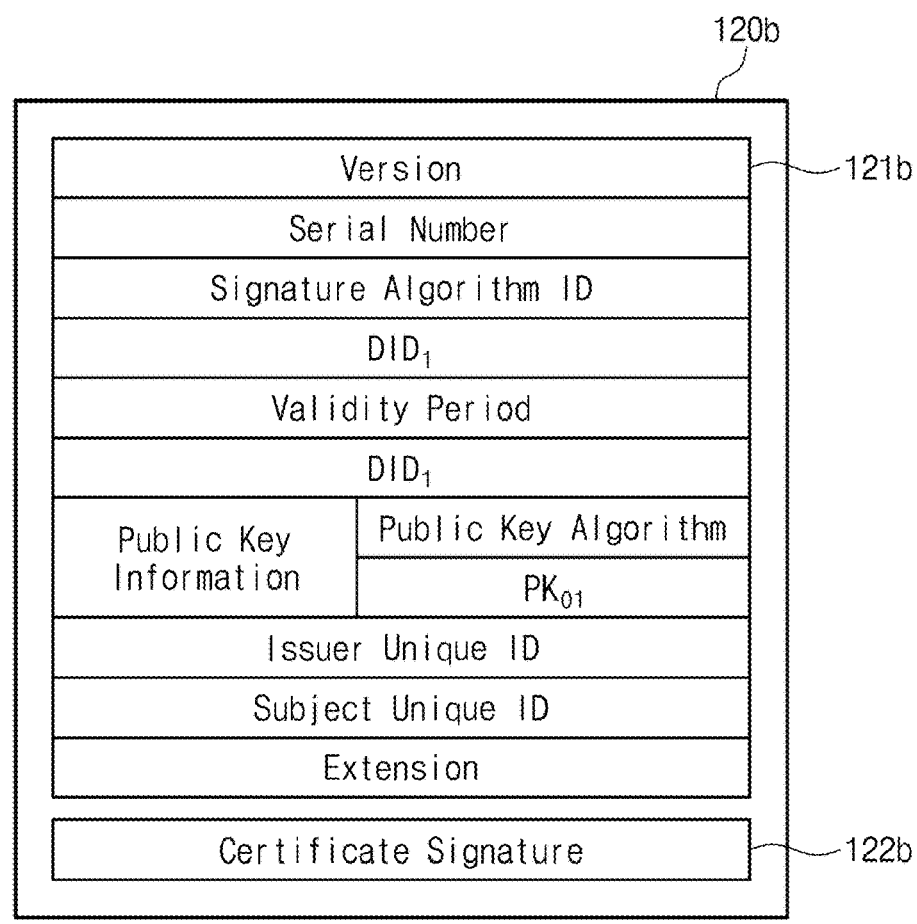
FIG. 10 is a conceptual diagram illustrating some example embodiments of a certificate of FIG. 1.

FIG. 10 is a conceptual diagram illustrating some example embodiments of a certificate of FIG. 1.

The first electronic device 100 of FIG. 1 may generate a new certificate 120b for the purpose of registering the newly generated public key $PK_{O1}$ at a distributed ledger. Because a public key of the first electronic device 100 to be registered at the distributed ledger changes, the certificate 120b may also be different from the certificate 120 of FIG. 5. However, the certificate 120b may be identical to the certificate 120 except for a portion associated with the public key of the first electronic device 100. Thus, additional description will be omitted to avoid redundancy.

The public key value field of the certificate 120b may indicate "$PK_{O1}$", and not "$PK_1$". Because identity information 121b included in the certificate 120b is changed, a certificate signature 122b may also be changed.

FIG. 11 is a diagram for describing a signature of a transaction of FIG. 9.

As described with reference to FIG. 9, the signature $\sigma_{O1\_1}$ may be a result of encrypting a hash value being a result of hashing the message 111a registered at the distributed ledger and a hash value $HC_{O1}$ of the message 111b, with the encryption being based on the (previous) private key $SK_1$. The signature $\sigma_{O1\_2}$ may be a result of encrypting a hash value being a result of hashing the message 111b, with the encryption being by using the new private key.

Figure 12:
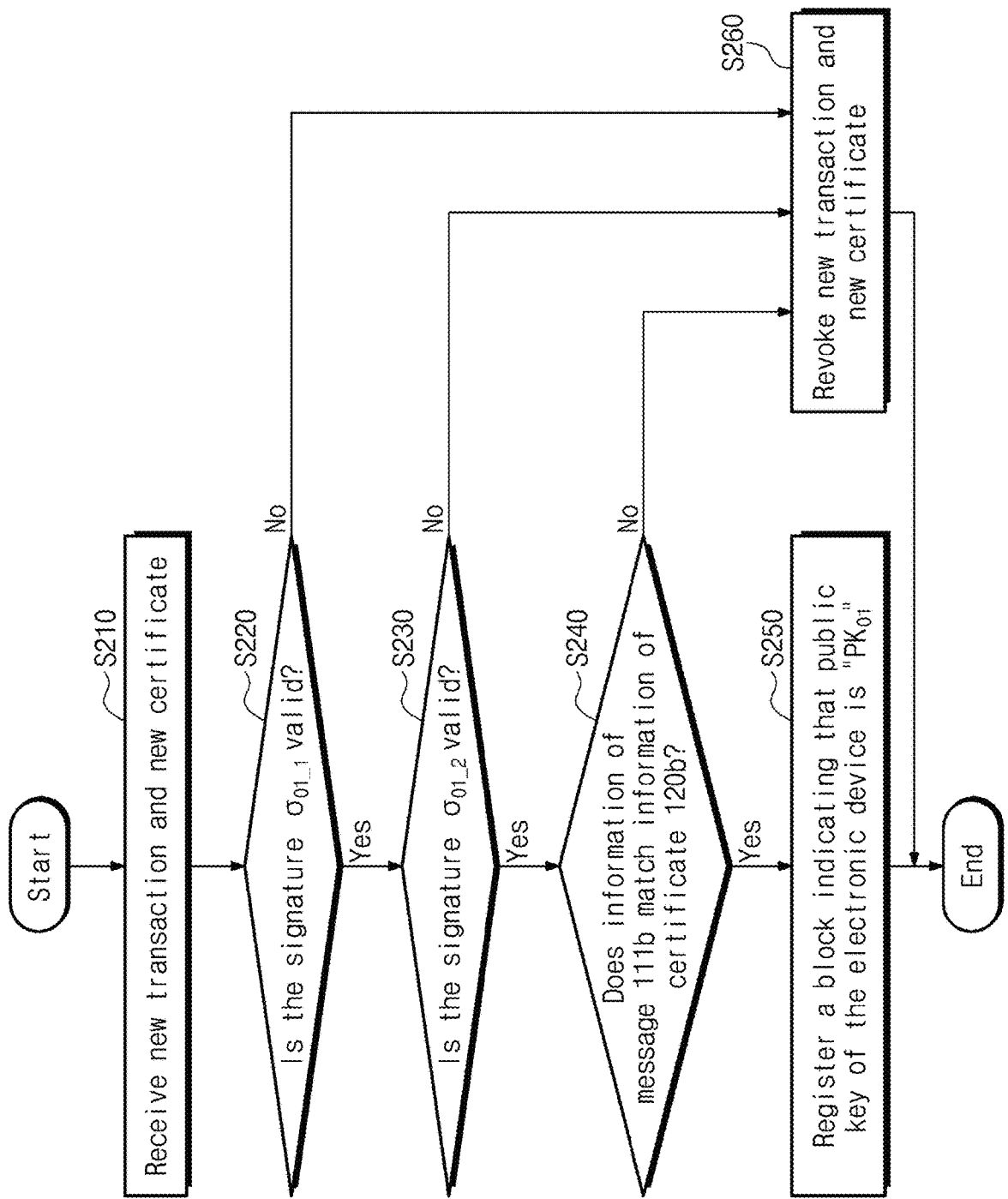
FIG. 12 is a flowchart for describing a method in which a node of FIG. 1 verifies a transaction and a certificate.

FIG. 12 is a flowchart for describing a method in which a node of FIG. 1 verifies a transaction and a certificate.

The first electronic device 100 of FIG. 1 may generate the transaction 110b of FIG. 9 and the certificate 120b of FIG. 10 for the purpose of registering the newly generated public key $PK_{O1}$ at a distributed ledger. The node 410 of FIG. 1 may receive a transaction and a certificate from the first electronic device 100. In the description given with reference to FIG. 12, the transaction and the certificate that the node 410 receives are expressed as a new transaction and a new certificate. In a case where the transaction 110b and the certificate 120b are transmitted from the first electronic device 100 to the node 410 without an attack and/or corruption, the transaction and the certificate that the node 410 receives may be identical to the transaction 110b and the certificate 120b.

In operation S210, the node 410 may receive the new transaction and the new certificate.

In operation S220, the node 410 may determine whether the signature $\sigma_{O1\_1}$ of the transaction 110b is valid. The node 410 may decrypt the signature $\sigma_{O1\_1}$ by using a public key $PK_1$. The node 410 may obtain the public key $PK_1$ from the transaction 110b. The node 410 may hash both the message 111a of the transaction 110a registered at the distributed ledger and the hash value $HC_{O1}$. The node 410 may obtain the hash value $HC_{O1}$ from the transaction 110b. The node 410 may compare the decrypted signature $\sigma_{O1\_1}$ and the hash value, with the hash value being a result of hashing the message 111a and the hash value $HC_{O1}$. When the decrypted signature $\sigma_{O1\_1}$ and the hash value being a result of hashing the message 111a and the hash value $HC_{O1}$ coincide, the node 410 may determine that the signature $\sigma_{O1\_1}$ is valid.

When the node 410 determines that the signature $\sigma_{01\_1}$ is invalid, operation S260 may be performed. In operation S260, the node 410 may revoke the new transaction and the new certificate.

When the node 410 determines that the signature $\sigma_{01\_1}$ is valid, operation S230 may be performed. In operation S230, the node 410 may determine whether the signature $\sigma_{01\_2}$ of the transaction 110b is valid. The node 410 may decrypt the signature $\sigma_{01\_2}$ by using a public key $PK_{01}$. The node 410 may obtain the public key $PK_{01}$ from the transaction 110b. An operation in which the node 410 determines whether the signature $\sigma_{01\_2}$ is valid is substantially identical to operation (a) to operation (c) of FIG. 6, and thus, additional description will be omitted to avoid redundancy.

When the node 410 determines that the signature $\sigma_{01\_2}$ is invalid, operation S260 may be performed. In operation S260, the node 410 may revoke the new transaction and the new certificate.

When the node 410 determines that the signature $\sigma_{01\_2}$ is valid, operation S240 may be performed. In operation S240, the node 410 may determine whether information included in the message 111b and information included in the certificate 120b coincide. An operation in which the node 410 determines whether information included in the message 111b and information included in the certificate 120b coincide is substantially identical to operation (a) and operation (d) to operation (g) of FIG. 6, and thus, additional description will be omitted to avoid redundancy.

When the information included in the message 111b and the information included in the certificate 120b do not coincide, operation S260 may be performed. In operation S260, the node 410 may revoke the new transaction and the new certificate.

When the information included in the message 111b and the information included in the certificate 120b coincide, operation S250 may be performed. That the signature $\sigma_{01\_1}$ and the signature $\sigma_{01\_2}$ are valid and the information included in the message 111b and the information included in the certificate 120b coincide means/corresponds to at least the following: (1) the electronic device 100 generating the transaction 110a generates the transaction 110b, and (2) the transaction 110b and the certificate 120b are not attacked/corrupted while transmitted from the electronic device 100 to the node 410.

In operation S250, the node 410 may generate a block including the new transaction. The node 410 may register the generated block at the distributed ledger. For example, a block indicating that a public key of the first electronic device 100 having the ID $DID_1$ is "$PK_{01}$" may be registered at the distributed ledger.

Figure 13:
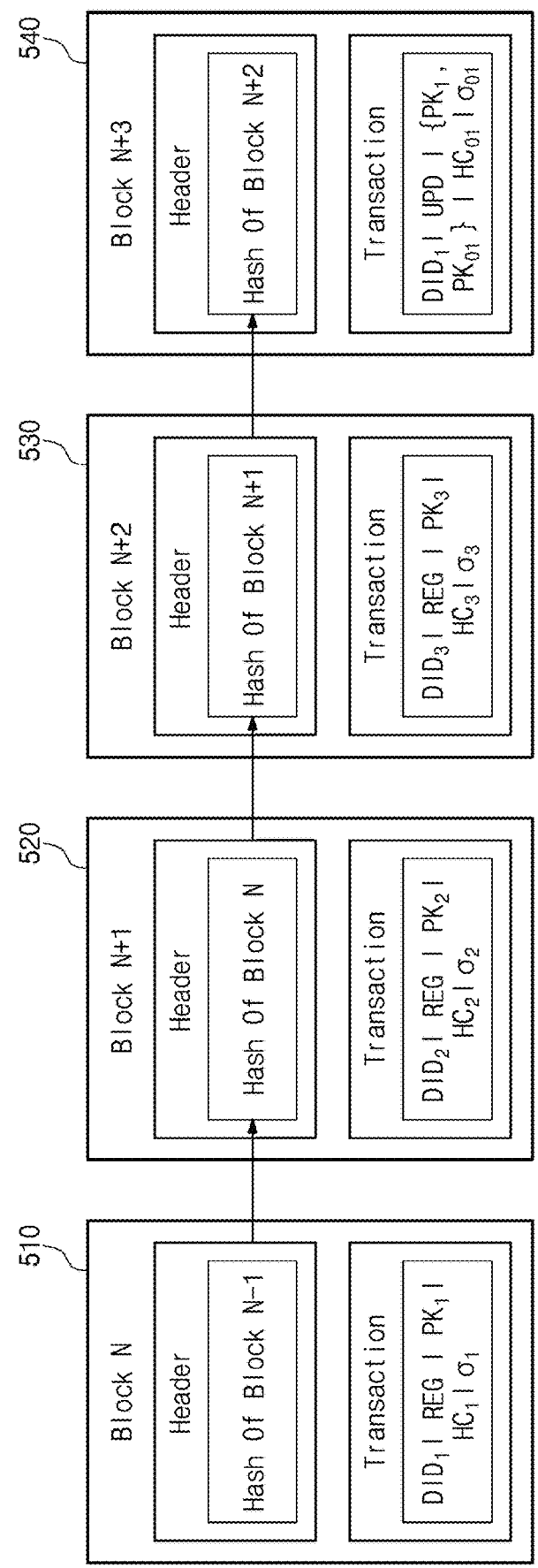
FIG. 13 is a conceptual diagram for indicating blocks registered at a distributed ledger on a blockchain network of FIG. 1.

FIG. 13 is a conceptual diagram for indicating blocks registered at a distributed ledger on a blockchain network of FIG. 1.

As described with reference to FIG. 12, the node 410 of FIG. 1 may generate a block 540 when the new transaction and the new certificate are successfully verified. The block 540 may be linked to the previously generated block 530. That the block 540 is linked to the block 530 may mean that a header of the block 540 refers to a hash value of a header of the block 530.

The block 540 may indicate that a public key of the first electronic device 100 having the ID $DID_1$ is changed from "$PK_1$" to "$PK_{01}$".

There may be other information included in each of the blocks 510 to 530; however, example embodiments are not limited thereto. For example, there may include a proof-of-work included in each of the blocks 510 to 530; however, example embodiments are not limited thereto. Furthermore, the transaction data may be organized as a tree, for example as Merkle tree; however, example embodiments are not limited thereto.

Accordingly, the distributed ledger where the blocks 510 to 540 are registered may secure the following: a public key of the first electronic device 100 having the ID $DID_1$ is "$PK_{01}$", a public key of the second electronic device 200 having the ID $DID_2$ is "$PK_2$", and a public key of the third electronic device 300 having an ID $DID_3$ is "$PK_3$".

Figure 14:
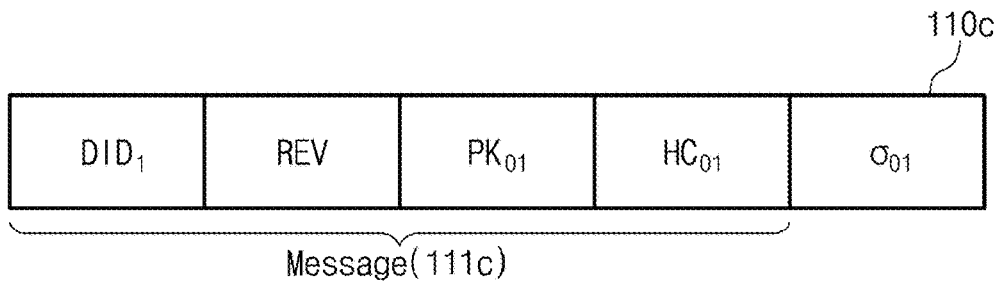
FIG. 14 is a conceptual diagram illustrating some example embodiments of a transaction of FIG. 1.

FIG. 14 is a conceptual diagram illustrating some example embodiments of a transaction of FIG. 1.

The first electronic device 100 of FIG. 1 may generate a transaction 110c for the purpose of revoking the public key $PK_{01}$ registered at the distributed ledger.

The transaction 110c may include a message 111c and a signature $\sigma_{01}$. The message 111c may include "$DID_1$", "REV", "$PK_{01}$", and "$HC_{01}$". "$DID_1$", "$PK_{01}$", and "$HC_{01}$" indicate an ID of the first electronic device 100, a public key of the first electronic device 100 registered at the distributed ledger, and a hash value being a result of hashing a certificate of the first electronic device 100, respectively. The first electronic device 100 may hash the certificate illustrated in FIG. 15 to generate a hash value $HC_{01}$. The signature $\sigma_{01}$ may be a result of encrypting a result of hashing the message 111c, with the encryption being by using a new private key.

Figure 15:
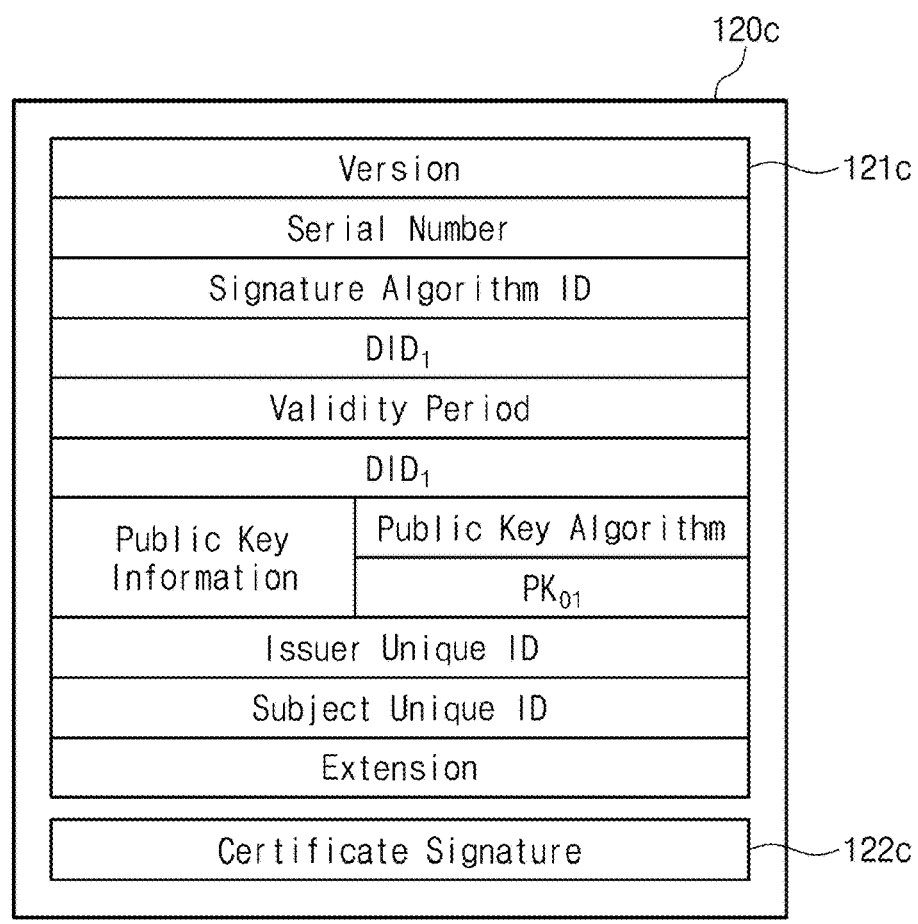
FIG. 15 is a conceptual diagram illustrating some example embodiments of a certificate of FIG. 1.

FIG. 15 is a conceptual diagram illustrating some example embodiments of a certificate of FIG. 1.

The first electronic device 100 of FIG. 1 may generate a certificate 120c for the purpose of revoking the public key $PK_{01}$ registered at the distributed ledger. Because the public key $PK_{01}$ included in the transaction 110c of FIG. 14 is identical to the public key $PK_{01}$ included in the transaction 110b of FIG. 9, the certificate 120c may be identical to the certificate 120b of FIG. 10. Thus, additional description will be omitted to avoid redundancy.

Figure 16:
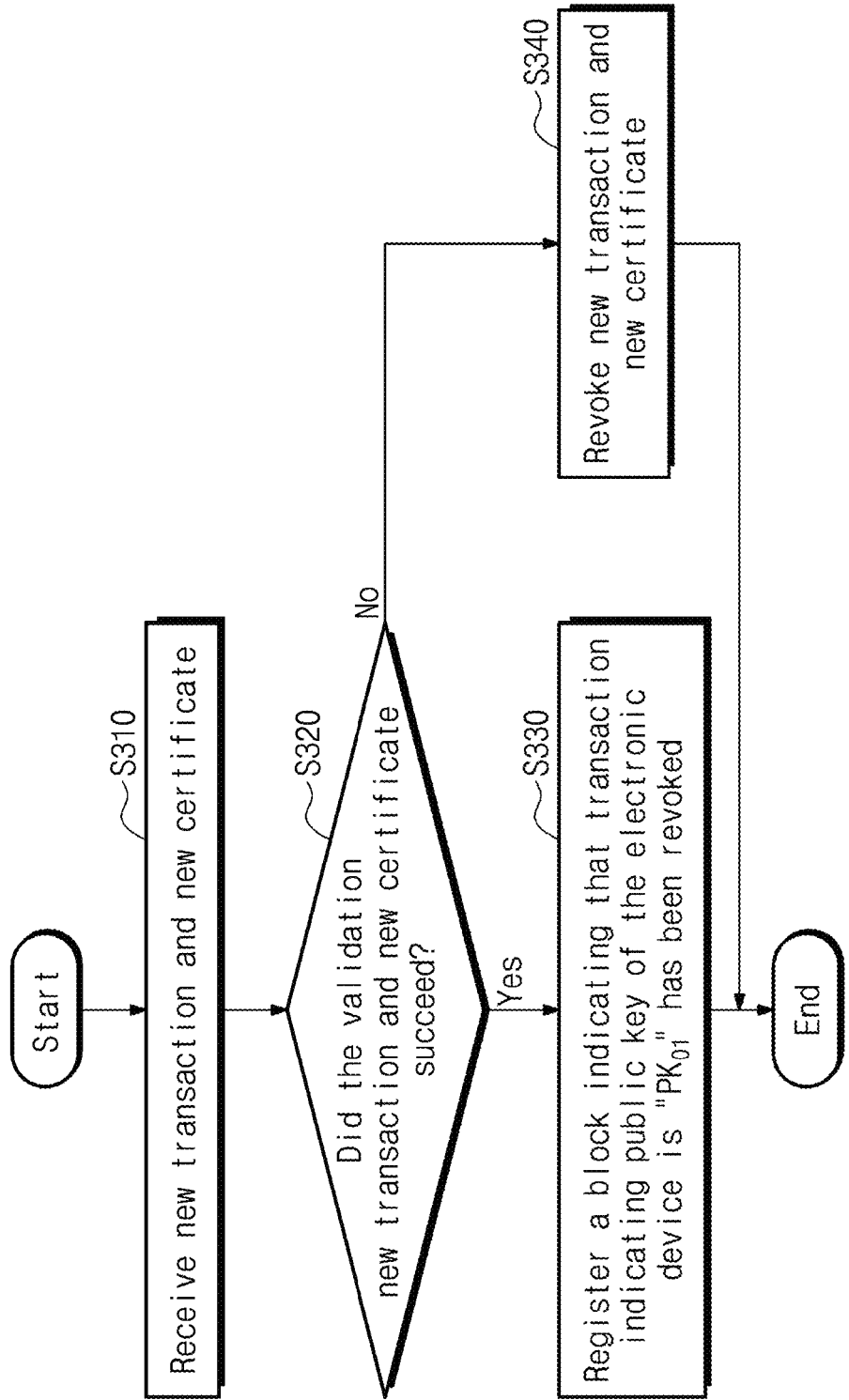
FIG. 16 is a flowchart for describing a method in which a node of FIG. 1 verifies a transaction and a certificate.

FIG. 16 is a flowchart for describing a method in which a node of FIG. 1 verifies a transaction and a certificate.

The first electronic device 100 of FIG. 1 may generate the transaction 110c of FIG. 14 and the certificate 120c of FIG. 15 for the purpose of revoking the public key $PK_{01}$ registered at the distributed ledger. The node 410 of FIG. 1 may receive a transaction and a certificate from the first electronic device 100. In the description given with reference to FIG. 16, the transaction and the certificate that the node 410 receives are expressed as a new transaction and a new certificate. In a case where the transaction 110c and the certificate 120c are transmitted from the first electronic device 100 to the node 410 without an attack/corruption, the transaction and the certificate that the node 410 receives may be identical to the transaction 110c and the certificate 120c.

The node 410 may verify the new transaction and the new certificate. Operations in which the node 410 verifies the new transaction and the new certificate are substantially identical to the operations (including operation (a) to operation (g)) described with reference to FIG. 6. Thus, additional description will be omitted to avoid redundancy.

In operation S310, the node 410 may receive the new transaction and the new certificate.

In operation S320, the node 410 may verify the new transaction and the new certificate. The node 410 may perform operation (a) to operation (g) of FIG. 6 on the new transaction and the new certificate.

When the new transaction and the new certificate are successfully verified, operation S330 may be performed. In operation S330, the node 410 may generate a block including the new transaction. The node 410 may register the generated block at the distributed ledger, for example by broadcasting the block on the P2P. That is, a block indicating that there is revoked a transaction meaning that a public key of the first electronic device 100 is "$PK_{O1}$" may be registered at the distributed ledger.

When the verification of the new transaction and the new certificate fails, operation S340 may be performed. In operation S340, the node 410 may revoke the new transaction and the new certificate.

Figure 17:
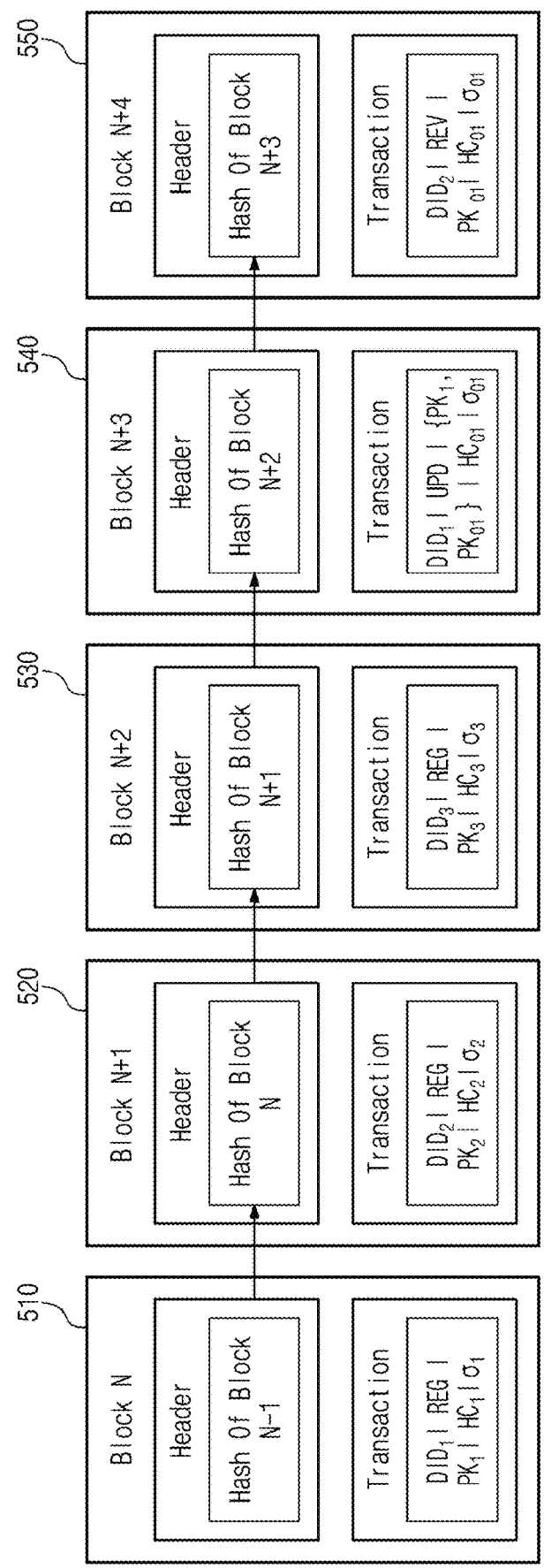
FIG. 17 is a conceptual diagram for indicating blocks registered at a distributed ledger on a blockchain network of FIG. 1.

FIG. 17 is a conceptual diagram for indicating blocks registered at a distributed ledger on a blockchain network of FIG. 1.

As described with reference to FIG. 16, the node 410 of FIG. 1 may generate a block 550 when the new transaction and the new certificate are successfully verified. The block 550 may be linked to the previously generated block 540.

There may be other information included in each of the blocks 510 to 530; however, example embodiments are not limited thereto. For example, there may include a proof-of-work included in each of the blocks 510 to 530; however, example embodiments are not limited thereto. Furthermore, the transaction data may be organized as a tree, for example as Merkle tree; however, example embodiments are not limited thereto.

The block 550 may indicate that there is revoked a transaction meaning that a public key of the first electronic device 100 having the ID $DID_1$ is "$PK_{O1}$". That is, the blocks 510, 540, and 550 may indicate that a public key of the first electronic device 100 having the ID $DID_1$ is "$PK_1$".

Accordingly, the distributed ledger where the blocks 510 to 550 are registered may secure the following: a public key of the first electronic device 100 having the ID $DID_1$ is "$PK_1$", a public key of the second electronic device 200 having the ID $DID_2$ is "$PK_2$", and a public key of the third electronic device 300 having an ID $DID_3$ is "$PK_3$".

Figure 18:
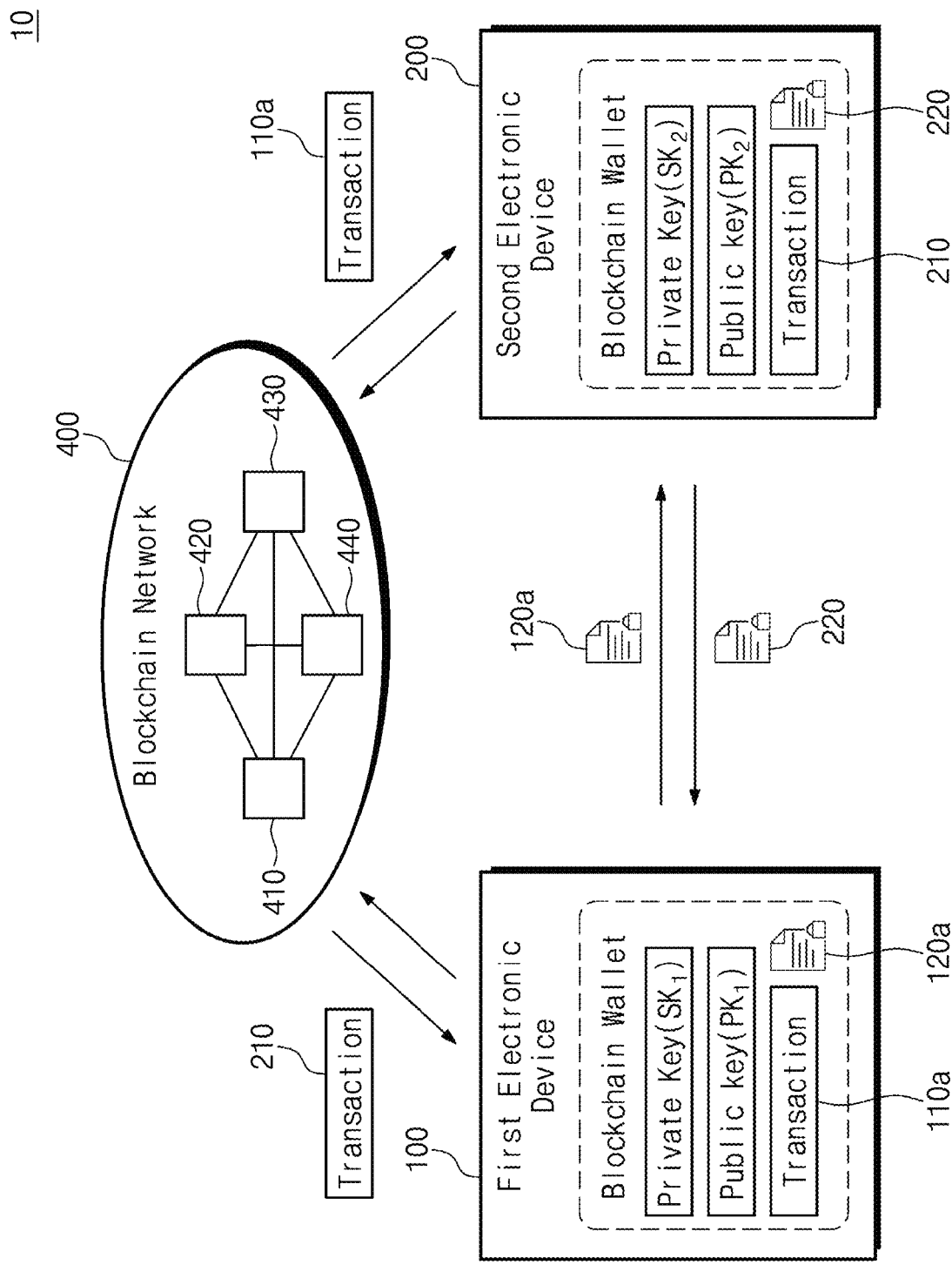
FIG. 18 is a conceptual diagram for describing a procedure in which electronic devices in a cryptographic communication system prove their own identities.

FIG. 18 is a conceptual diagram for describing a procedure in which electronic devices in a cryptographic communication system prove their own identities.

As described with reference to FIGS. 1 to 17, after the verification of the node 410, identity information of the electronic devices 100 and 200 may be registered at the distributed ledger of the blockchain network 400. In this case, the identities of the electronic devices 100 and 200 may be guaranteed and/or secured by the blockchain network 400.

The electronic devices 100 and 200 may deal with/communicate with each other. Before dealing with each other, each of the electronic devices 100 and 200 may check an identity of a counterpart. Because an operation of the first electronic device 100 and an operation of the second electronic device 200 are symmetrical, the operation of the first electronic device 100 is mainly described with reference to FIG. 18.

For a transaction, the first electronic device 100 may request the second electronic device 200 to prove an identity of the second electronic device 200. The second electronic device 200 may output a certificate 220 depending on the request of the first electronic device 100. The certificate 220 may be/include a certificate indicating the identity of the second electronic device 200. The second electronic device 200 may generate a private key $SK_2$, a public key $PK_2$, a transaction 210, and the certificate 220.

When the certificate 220 is received, the first electronic device 100 may request the transaction 210 including identity information of the second electronic device 200 from the blockchain network 400. The blockchain network 400 may search the distributed ledger for a block indicating the identity information of the second electronic device 200, depending on the request of the first electronic device 100. The blockchain network 400 may output the block indicating the identity information of the second electronic device 200 and/or the transaction 210 included in the block.

The first electronic device 100 may receive the transaction 210. The first electronic device 100 may verify the certificate 220 received from the second electronic device 200 and the transaction 210 received from the blockchain network 400. That the verification succeeds may mean the identity of the second electronic device 200 is verified.

The second electronic device 200 may verify the identity of the first electronic device 100 in a method similar to the method performed by the first electronic device 100.

In a case where both the verification in the first electronic device 100 and the verification in the second electronic device 200 succeed, the first electronic device 100 and the second electronic device 200 may deal with each other.

For example, the electronic devices 100 and 200 may verify counterpart's identities by using the distributed ledger of the blockchain network 400 without needing to verify counterpart's identities through layers of certification authorities. Accordingly, even though the number of electronic devices in the cryptographic communication system 10 increases, a time taken to verify an identity may not be long.

Figure 19:
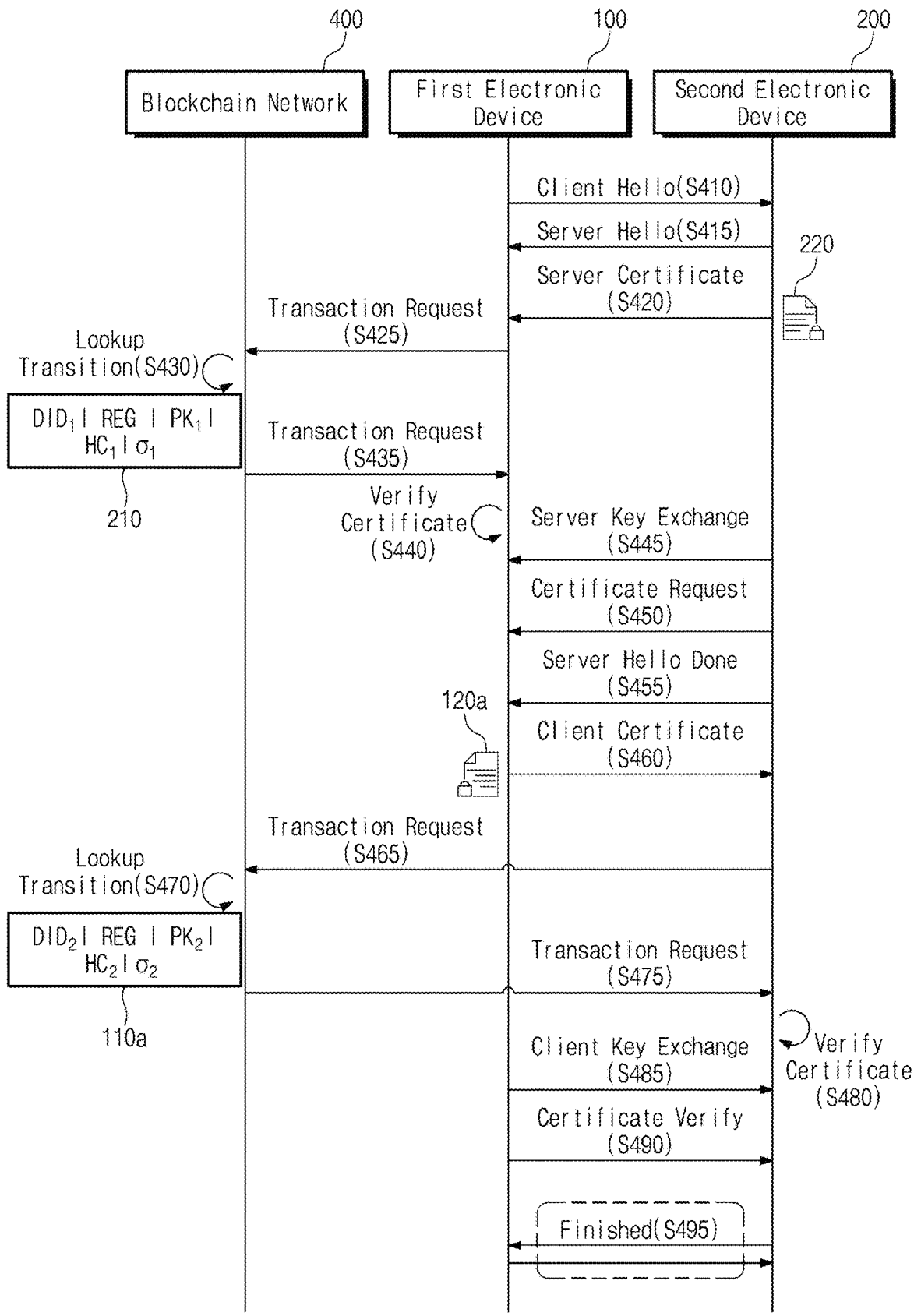
FIG. 19 is a flowchart for describing a procedure in which electronic devices in a cryptographic communication system prove their own identities.

FIG. 19 is a flowchart for describing a procedure in which electronic devices in a cryptographic communication system prove their own identities.

The electronic devices 100 and 200 and the blockchain network 400 may communicate based on a secure sockets layer (SSL) and/or a transport layer security (TLS). The SSL/TLS may be or include a standard cryptographic protocol for protecting data exchanged when communicating on the Internet. Because the SSL/TLS is a cryptographic manner of a transport layer, the SSL/TLS may be available regardless of a protocol kind of an application layer, such as FTP and/or XMPP, as well as HTTP. As described with reference to FIG. 19, the communication between the electronic devices 100 and 200 may be defined as a structure compatible with a TLS 1.2 handshake protocol. However, inventive concepts is not limited thereto. For example, the communication may be defined as a structure compatible with a protocol using a certificate such as TLS 1.3.

An operation in which the electronic devices 100 and 200 verify counterpart's identities, make mutual authentication, and establish a cryptographic channel, by using the SSL/TLS, is described with reference to FIG. 19. In the description given with reference to FIG. 19 and in FIG. 19, a "client" and a "server" may indicate the first electronic device 100 and the second electronic device 200, respectively.

In operation S410 and operation S415, the first electronic device 100 and the second electronic device 200 may transmit/receive basic information through 'hello' messages. For example, the first electronic device 100 may transmit the following information through the 'hello' message: an authentication algorithm, a key exchange algorithm, a hash algorithm, and a cryptographic algorithm that the first electronic device 100 supports. The second electronic device 200 may transmit the following information through the 'hello' message: an authentication algorithm, a key exchange algorithm, a hash algorithm, and a cryptographic algorithm that the second electronic device 200 supports.

In operation S420, the second electronic device 200 may output the certificate 220. The certificate 220 may include information about the public key $PK_1$ of the second electronic device 200.

When the certificate 220 is received from the second electronic device 200, in operation S425, the first electronic device 100 may request the blockchain network 400 to verify an identity of the second electronic device 200. In detail, the first electronic device 100 may request the transaction 210 indicating the identity of the second electronic device 200 from the blockchain network 400. For example, the first electronic device 100 may transmit a "Lookup" command to the blockchain network 400. The first electronic device 100 and the second electronic device 200 may communicate with different nodes. That is, the first electronic device 100 may request the node 410 of the blockchain network 400 to verify the identity of the second electronic device 200, and the second electronic device 200 may request a node 420 of the blockchain network 400 to verify the identity of the first electronic device 100.

Depending on the request of the first electronic device 100, in operation S430, the blockchain network 400 may look up the transaction 210 indicating the identity of the second electronic device 200 at the distributed ledger. Accordingly, the blockchain network 400 may look up in the order of recently registered block.

In operation S435, the blockchain network 400 may transmit the found transaction 210 to the first electronic device 100.

In operation S440, the first electronic device 100 may verify the transaction 210 received from the blockchain network 400 and the certificate 220 received from the second electronic device 200. The verification in the first electronic device 100 is substantially identical to the verification through operation (a) to operation (g) of FIG. 6. Thus, additional description will be omitted to avoid redundancy.

An operation in which the first electronic device 100 obtains the transaction 210 registered at the distributed ledger by using the blockchain network 400 is described with reference to operation S425 to operation S435. However, inventive concepts is not limited thereto. The first electronic device 100 may store a part of blocks registered at the distributed ledger. Accordingly, the first electronic device 100 may automatically loop up a block without requesting the transaction 210 from the blockchain network 400. A method in which the first electronic device 100 automatically looks up a block will be described with reference to FIG. 20.

In operation S445, the second electronic device 200 may send a server key exchange message when necessary/desirable to exchange a key with the first electronic device 100.

In operation S450 and operation S455, the second electronic device 200 may request the certificate 120a from the first electronic device 100 and may terminate a server hello.

In operation S460, the first electronic device 100 may output the certificate 120a depending on the request of the second electronic device 200. The certificate 120a may include information about the public key $PK_2$ of the first electronic device 100.

When the certificate 120a is received from the first electronic device 100, in operation S465, the second electronic device 200 may request the blockchain network 400 to verify the identity of the first electronic device 100. In detail, the second electronic device 200 may request the transaction 110a indicating the identity of the first electronic device 100 from the blockchain network 400. For example, the second electronic device 200 may transmit the "Lookup" command to the blockchain network 400.

Depending on the request of the second electronic device 200, in operation S470, the blockchain network 400 may look up the transaction 110a indicating the identity of the first electronic device 100 at the distributed ledger.

In operation S475, the blockchain network 400 may transmit the found transaction 110a to the second electronic device 200.

An operation in which the second electronic device 200 obtains the transaction 110a registered at the distributed ledger by using the blockchain network 400 is described with reference to operation S465 to operation S475. However, inventive concepts is not limited thereto. As described above, the second electronic device 200 may also store a part of blocks registered at the distributed ledger. In this case, the second electronic device 200 may automatically loop up a block without requesting the transaction 110a from the blockchain network 400. A method in which the second electronic device 200 automatically looks up a block will be described with reference to FIG. 20.

In operation S480, the second electronic device 200 may verify the transaction 110a received from the blockchain network 400 and the certificate 120a received from the first electronic device 100. The verification in the second electronic device 200 is substantially identical to the verification through operation (a) to operation (g) of FIG. 6. Thus, additional description will be omitted to avoid redundancy.

In operation S485, the first electronic device 100 may send a client key exchange message when necessary/desirable to exchange a key with the second electronic device 200.

In operation S490, the first electronic device 100 may transmit a certificate valid message for the purpose of providing notification that the identity of the second electronic device 200 is verified.

To provide notification that a handshake protocol is normally finished, in operation S495, the first electronic device 100 and the second electronic device 200 may transmit complete messages each other.

After determining that the handshake protocol is normally completed, the first electronic device 100 and the second electronic device 200 may start communication safely through the cryptographic channel.

Figure 20:
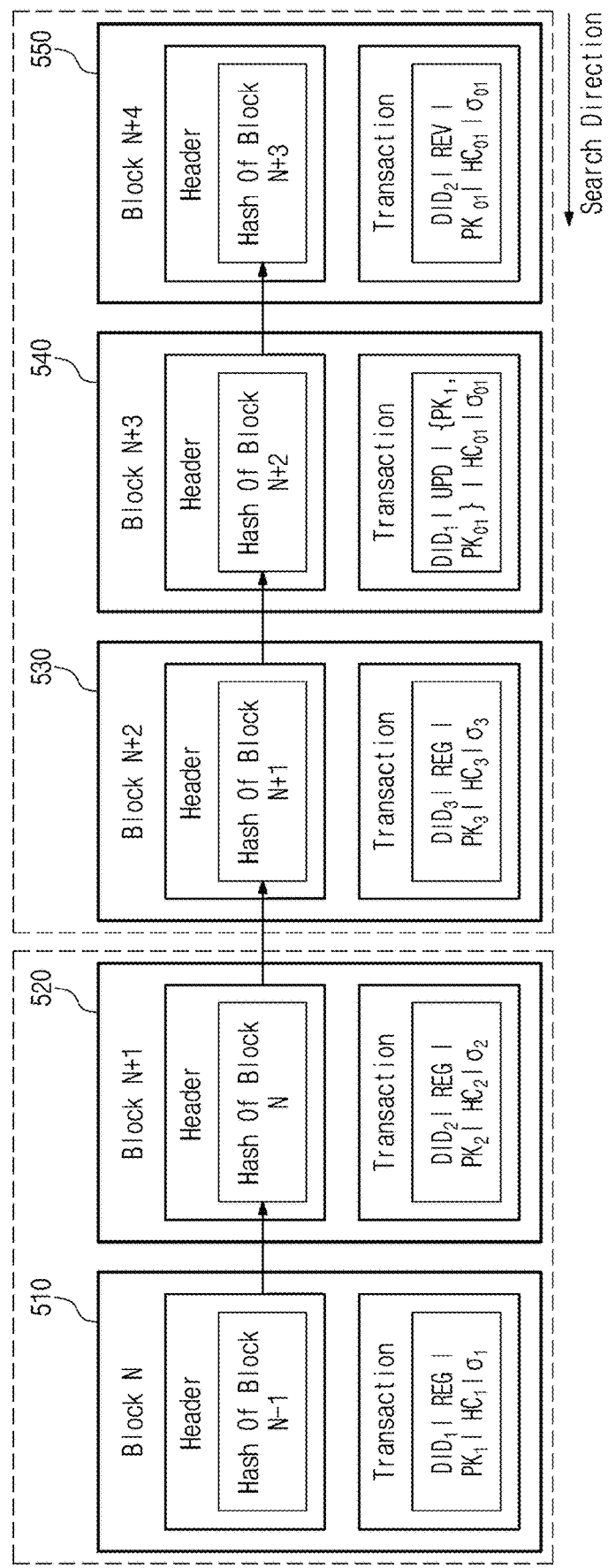
FIG. 20 is a conceptual diagram for describing a method in which electronic devices automatically search for a block.

FIG. 20 is a conceptual diagram for describing a method in which electronic devices automatically search for a block.

The electronic devices 100 and 200 may store a part of the blocks 510 to 550 registered at the distributed ledger. However, inventive concepts are not limited thereto. For example, the electronic devices 100 and 200 may store all the blocks 510 to 550 registered at the distributed ledger. Because the second electronic device 200 provides substantially the same operations as the first electronic device 100, the operation of the first electronic device 100 is mainly described with reference to FIG. 20.

The first electronic device 100 may store the blocks 530 to 550. The blocks 530 and 550 may be blocks, which are registered the most lately, from among the blocks 510 to 550. The first electronic device 100 may search the blocks 530 to 550 for the purpose of finding the block 520 indicating the identity of the second electronic device 200. The first electronic device 100 may search the blocks 530 to 550 in the order of the most recently registered block.

In a case where the first electronic device 100 fails to look up the block 520 indicating the identity of the second electronic device 200 in the blocks 530 to 550, the first electronic device 100 may additionally download the blocks 510 and 520 from the distributed ledger. The first electronic device 100 may search the blocks 510 to 520 to look up the block 520.

Figure 21:
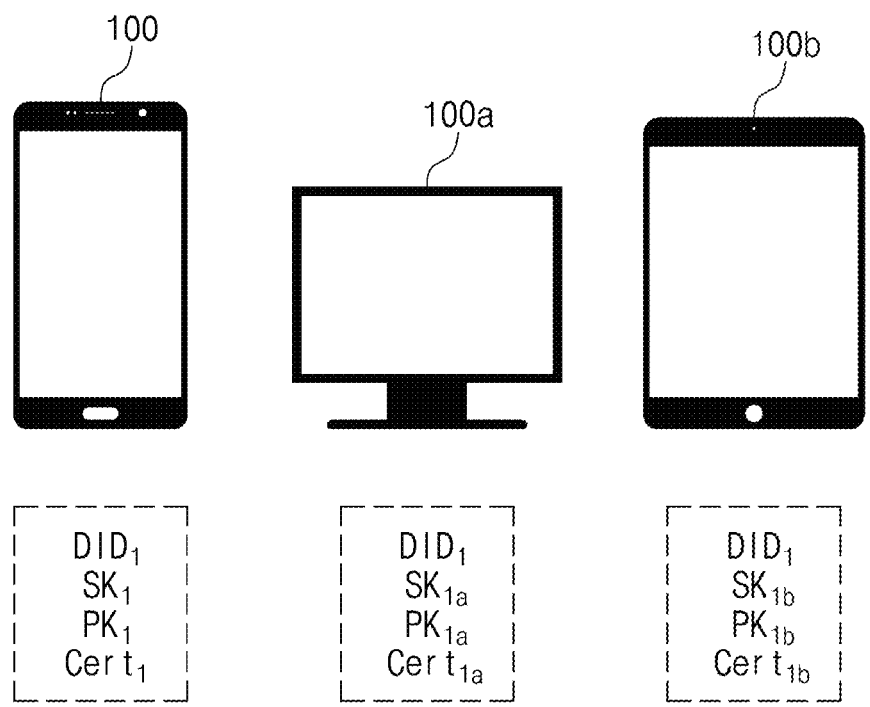
FIG. 21 is a conceptual diagram for describing how to extend a public key registered at a distributed ledger.

FIG. 21 is a conceptual diagram for describing how to extend a public key registered at a distributed ledger.

A user that uses the first electronic device 100 may additionally use first electronic devices 100a and 100b. The user may set IDs $DID_{1a}$ and $DID_{1a}$ of the first electronic devices 100a and 100b to be identical to the ID $DID_1$ of the first electronic device 100. That is, the first electronic device 100 may share the ID $DID_{1a}$ with the first electronic devices 100a and 100b. However, private keys $SK_{1a}$ and $SK_{1b}$, public keys $PK_{1a}$ and $PK_{1b}$, and certificates $Cert_{1a}$ and $Cert_{1b}$ of the first electronic devices 100a and 100b may be different from the private key $SK_1$, the public key $PK_1$, and the certificate $Cert_1$ of the first electronic device 100.

In a case where the identity information of the first electronic device 100 is already registered at the distributed ledger, the first electronic devices 100a and 100b may use an "EXT" command for the purpose of registering identity information of the first electronic devices 100a and 100b.

In detail, in the case of intending to register the identity information of the first electronic device 100a in a state where the identity information of the first electronic device 100 is already registered at the distributed ledger, the first electronic device 100 or the first electronic device 100a may generate a transaction including the "EXT" command. The transaction including the "EXT" command will be more fully described with reference to FIG. 22. The first electronic device 100 or the first electronic device 100a may transmit a transaction including the "EXT" command and a certificate indicating the identity of the first electronic device 100a to the node 410 of FIG. 1.

The node 410 may verify the transaction including the "EXT" command and the certificate indicating the identity of the first electronic device 100a; if successful, the node 410 may generate a block including a transaction including the "EXT" command. In this case, two public keys $PK_1$ and $PK_{1a}$ may be registered with regard to one ID $DID_1$.

Figure 22:
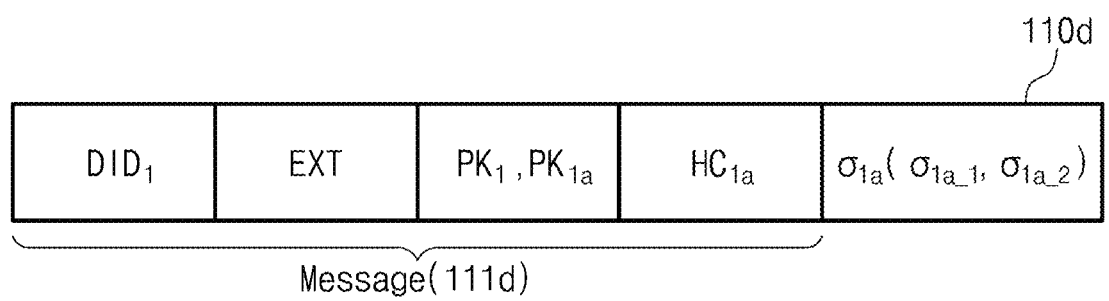
FIG. 22 is a conceptual diagram illustrating some example embodiments of a transaction of FIG. 1.

FIG. 22 is a conceptual diagram illustrating some example embodiments of a transaction of FIG. 1.

A transaction 110d may include a message 111d and a signature $\sigma_{1a}$. The message 111d may include "$DID_1$", "EXT", "{$PK_1$, $PK_{1a}$}", and "$HC_{1a}$". "$DID_1$", "$PK_1$", "$PK_{1a}$", and "$HC_{1a}$" indicate an ID of the first electronic device 100a, a public key of the first electronic device 100 registered at the distributed ledger, a public key of the first electronic device 100a to which the first electronic device 100 is extended, and a hash value being a result of hashing a certificate of the first electronic device 100a, respectively.

The signature $\sigma_{1a}$ may include a signature $\sigma_{1a\_1}$ and a signature $\sigma_{1a\_2}$. The signature $\sigma_{1a\_1}$ may be a result of encrypting a hash value being a result of hashing the message 111a registered at the distributed ledger and a hash value $HC_{1a}$ of the message 111d, by using the private key $SK_1$. The message 111a may be a message indicating the identity of the first electronic device 100 from among messages registered at the distributed ledger. The private key $SK_1$ may be a private key of the first electronic device 100. The signature $\sigma_{1a\_2}$ may be a result of encrypting a hash value being a result of hashing the message 111d by using the private key $SK_{1a}$. The private key $SK_{1a}$ may be a private key of the first electronic device 100a.

Because the first electronic device 100 and the first electronic device 100a share identity information each other, as well as the first electronic device 100a, the first electronic device 100 may generate the transaction 110d.

The first electronic device 100a may generate a certificate indicating an identity of the first electronic device 100a. The certificate indicating the identity of the first electronic device 100a is identical to the certificate 120a of FIG. 5, and thus, additional description will be omitted to avoid redundancy.

The first electronic device 100 or the first electronic device 100a may transmit the transaction 110d and the certificate indicating the identity of the first electronic device 100a to the node 410. The node 410 may verify the transaction 110d and the certificate of the first electronic device 100a. A method in which the node 410 verifies the transaction 110d and the certificate of the first electronic device 100a is similar to operation S220 to operation S240 described with reference to FIG. 12. Thus, additional description will be omitted to avoid redundancy.

Figure 23:
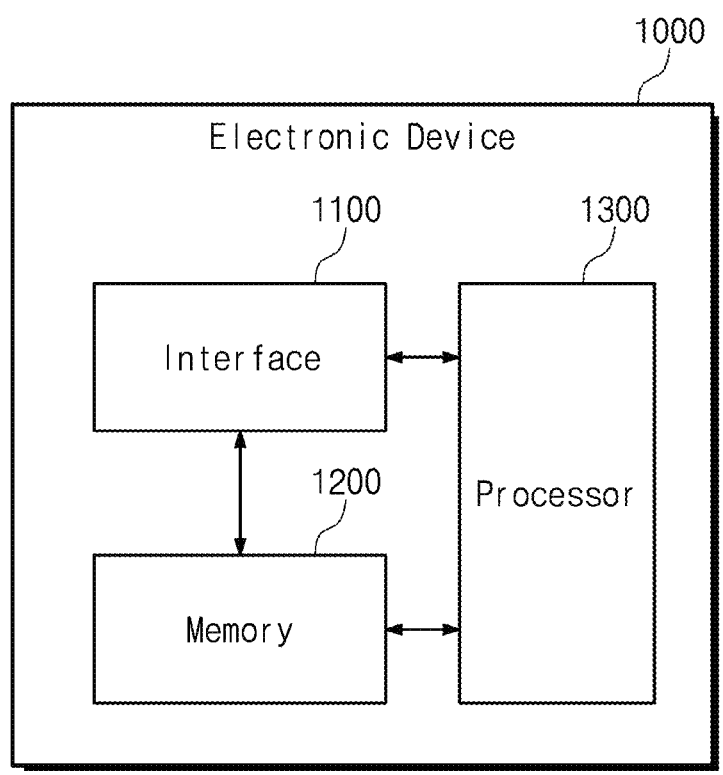
FIG. 23 is a block diagram illustrating a cryptographic communication system of FIG. 1.

FIG. 23 is a block diagram illustrating a cryptographic communication system of FIG. 1.

An electronic device 1000 may include an interface 1100, a memory 1200, and a processor 1300. However, all the components illustrated in FIG. 23 are not essential. The electronic device 1000 may be implemented with more than the components illustrated in FIG. 23 or may be implemented with less than the components illustrated in FIG. 23. Below, the components are described.

According to some example embodiments, the interface 1100 may perform communication with an external device. In detail, the interface 1100 may, through a wired and/or wireless connection, connect to a network to perform communication with the external device. Here, the external device may be a server, a smartphone, a tablet, a PC, a computing device, etc. The interface 1100 may include a communication module supporting one of various wired/wireless communication schemes. For example, the communication module may be in the form of a chipset or may be a sticker/barcode (e.g., a sticker including an NFC tag) including information necessary/desirable for communication. Also, the communication module may be a short range communication module or a wired communication module.

According to some example embodiments, the memory 1200 may include a storage medium that is implemented in at least one of the following memory types: a flash memory, a hard disk, a multimedia card micro, a card type memory (e.g., SD memory, XD memory, etc.), a RAM (Random Access Memory), an SRAM (Static Random Access Memory), a ROM (Read-Only Memory), an EEPROM (Electrically Erasable Programmable Read-Only Memory), a PROM (Programmable Read-Only Memory), a magnetic memory, a magnetic disc, an optical disc, etc. In the case where the electronic device 1000 is the node 410 of FIG. 1, the memory 1200 may store at least one program for executing an operating method of the node 410 on a blockchain network, which distributes and manages a ledger at which a transaction of cryptocurrency is registered. In a case where the electronic device 1000 is the first electronic device 100 of FIG. 1, the memory 1200 may store program codes for executing a blockchain wallet. At least one program stored in the memory 1200 may be divided into a plurality of modules based on functions. Electronic devices and/or extended electronic devices such as electronic devices 200, 300, 400, 1000, 1300, etc. and/or a nodes such as node 410 may include a processor and/or processing circuitry such as hardware including logic circuits; a hardware/software combination such as a processor and/or processing circuitry executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to some example embodiments, the processor 1300 may control the overall operations of the electronic device 1000 and may include at least one processor such as a central processing unit (CPU). The processor 1300 may include at least one processor specialized to correspond to each function or may be one integrated processor. In a case where the electronic device 1000 is the node 410, the processor 1300 may perform a verification operation on a transaction and a certificate by using pieces of information stored in the memory 1200. In the case where the electronic device 1000 is the first electronic device 100 of FIG. 1, the processor 1300 may execute a blockchain wallet and may generate a private key, a public key, a transaction, and a certificate.

Inventive concepts may guarantee identities of electronic devices in a cryptographic communication system based on a blockchain network without several layers of certification authorities. Alternatively or additionally, even though the number of electronic devices in the cryptographic communication system increases, a time taken to verify an identity may not be long. Alternatively or additionally, the cryptographic communication system according to some example embodiments of inventive concepts is compatible with an existing standard protocol. Alternatively or additionally, security of certification may be improved, for example, because certificates may be recorded on a blockchain network that does not include a root/administrator.

While inventive concepts has been described with reference to example embodiments thereof, it will be apparent to those of ordinary skill in the art that various changes and modifications may be made thereto without departing from the spirit and scope of inventive concepts as set forth in the following claims.

What is claimed is:

1. A cryptographic communication system comprising:
    an electronic device configured to output a certificate and a transaction including a public key, a signature, and a first hash value of the certificate; and
    a node configured to first determine whether the electronic device generated the transaction based on the transaction and the certificate by comparing a second hash value generated by hashing of the certificate to a third hash value generated by decrypting the signature with the public key, to second determine whether information included in the transaction and information included in the certificate coincide by comparing the first hash value to the second hash value, and to third add a block to a distributed ledger depending on the result of the first determining and the second determining, wherein the block includes the transaction,
    wherein the electronic device is configured to generate the certificate such that the certificate includes an ID of the electronic device and the public key of the electronic device,
    wherein the electronic device is configured to execute a blockchain wallet and to generate the ID, the public key, and a private key corresponding to the public key, and
    wherein, in response to the electronic device intending to register identity information on the distributed ledger, the electronic device is configured to generate a transaction such that the transaction includes a message including the ID, a registration command, the public key, and the first hash value, the signature being a result of an encryption of the message based on the private key.

2. The cryptographic communication system of claim 1, wherein the electronic device is configured to generate the certificate such that each of an issuer field and a subject field of the certificate includes information about the ID.

3. The cryptographic communication system of claim 1, wherein
    the node is configured to determine that information included in the transaction and information included in the certificate coincide, in response to (a) the ID included in the transaction and an ID that the certificate coinciding, and (b) the public key included in the transaction and a public key that the certificate coinciding.

4. The cryptographic communication system of claim 1, wherein, in response to the electronic device intending to revoke identity information registered at the distributed ledger after the identity information is registered at the distributed ledger, the electronic device is configured to generate a transaction such that the transaction includes a signature and a message including the ID, a revoke command, the public key, and the first hash value, the signature being a result of an encryption of the message based on the private key.

5. The cryptographic communication system of claim 1, wherein, in response to the electronic device intending to update the identity information registered at the distributed ledger, the electronic device is configured to generate a new private key and a new public key corresponding to the new private key, to generate a new certificate including the new public key, and to generate a new transaction including (1) a first signature, (2) a second signature, and (3) a new message including (a) the ID, (b) an update command, (c) the public key, and (d) the new public key, and (e) a fourth hash value of a hashing of the new certificate, the first signature corresponding to an encryption of the message and the first hash value based on the private key, and the second signature corresponding to an encryption of the new message based on the new private key.

6. The cryptographic communication system of claim 5, wherein the node is configured to determine that the electronic device generated the new transaction in response to (a) a hash value of a hashing of the certificate received from the electronic device and the fourth hash value being match with a value of a decryption of the first signature based on the public key included in the transaction, and (b) a fifth hash value of a hashing of the new certificate received from the electronic device being matched with a value of a decryption of the second signature based on the new public key included in the new transaction, and
    the node is configured to determine that information included in the new transaction and information included in the new certificate coincide, in response to the ID included in the new transaction and an ID associated with the new certificate coincide, the new public key included in the new transaction and a new public key included in the new certificate coincide, and the fourth hash value and the fifth hash value coincide.

7. The cryptographic communication system of claim 1, further comprising:
    an extended electronic device having an extended public key and an extended private key,
    wherein, in response to the electronic device intending to share the ID with the extended electronic device, the electronic device is configured to generate an extended certificate including the extended public key, and is configured to generate an extended transaction including (1) a first signature, (2) a second signature, and (3) an extended message including (a) the ID, (b) an extension command, (c) the public key, (d) the extended public key, and (e) a fourth hash value of a hashing of the extended certificate, the first signature corresponding to an encryption of the message and the first hash value based on the private key, and (f) the second signature corresponding to an encryption of the extended message based on the extended private key.

8. The cryptographic communication system of claim 7, wherein the node is configured to determine that the electronic device generated the extended transaction, in response to (a) a hash value of a hashing of the certificate received from the electronic device and the third hash value matching with a value of a decryption of the first signature based on the public key included in the transaction, and (b) a fifth hash value of a hashing of the extended certificate received from the electronic device matching with a value of a decryption of the second signature based on the extended public key included in the extended transaction, and
the node is configured to determine that information included in the extended transaction and information included in the extended certificate coincide, in response to the ID included in the extended transaction and an ID included in the extended certificate coinciding, the extended public key included in the extended transaction and an extended public key included in the extended certificate coinciding, and the fourth hash value and the fifth hash value coinciding.

9. An electronic device of a cryptographic communication system, comprising:
an interface;
processing circuitry; and
a memory configured to store instructions executable by the processing circuitry,
wherein the instructions, when executed by the processing circuitry, cause the processing circuitry to,
generate a first certificate including an ID and a public key, the ID and the public key being associated with the electronic device,
generate a first transaction including a public key, a signature and a first hash value of a hashing of the first certificate,
output the first certificate and the first transaction to a distributed ledger through the interface,
obtain a second transaction including an identity of an external electronic device from the distributed ledger in response to a second certificate indicating the external electronic device received the identity of the external electronic device, and
verify the identity of the external electronic device based on the second certificate and the second transaction by comparing a second hash value generated by hashing of the certificate to a third hash value generated by decrypting the signature with the public key,
wherein the electronic device is confirmed to execute a blockchain wallet and to generate the ID, the public key, and a private key corresponding to the public key, and
wherein, in response to the electronic device intending to register identity information on the distributed ledger, the electronic device is configured to generate a transaction such that the transaction includes a message including the ID, a registration command, the public key, and the first hash value, the signature being a result of an encryption of the message based on the private key.

10. The electronic device of claim 9, wherein the instructions, when executed by the processing circuitry, cause the processing circuitry to:
generate the first certificate that the first certificate complies with an X.509 certificate format.

11. The electronic device of claim 9, wherein the certificate includes a serial number field, a signature algorithm ID field, an issuer field, a validity period field, a subject field, a public key information field, an issuer unique ID field, an extension field, and a certificate signature field,
wherein the signature algorithm ID field includes information about a hash algorithm is used by the electronic device, and
wherein the issuer field and the subject field include information about the ID of the electronic device.

12. The electronic device of claim 9, wherein a communication between the electronic device and the external electronic device is based on a structure compatible with a TLS 1.2 handshake protocol.

13. A cryptographic communication method comprising:
receiving a first certificate of a first electronic device and a first transaction including a signature, a public key, and a first hash value of the certificate;
comparing a first result value corresponding to a decryption of the signature of the first transaction, the decryption being of the signature and based on the first public key included in the first transaction, the comparison being with a second hash value of a hashing of the first certificate received from the first electronic device;
comparing information included in the first transaction with information included in the first certificate; and
registering the first transaction at a distributed ledger in response to the first result value and the second hash value coinciding, and the information included in the first transaction and the information included in the first certificate coinciding,
wherein the method comprises executing a blockchain wallet and generating the public key, and a private key corresponding to the public key, and
wherein, in response to the electronic device intending to register identity information on the distribute ledger, the method comprises generating a transaction such that the transaction includes a message including the ID, a registration command, the public key, and the first hash value, the signature being a result of an encryption of the message based on the private key.

14. The cryptographic communication method of claim 13, further comprising:
receiving a second certificate of a second electronic device and a second transaction including a third hash value of the second certificate;
comparing a second result value corresponding to a decryption of a portion of the second transaction based on a second public key included in the second transaction with a fourth hash value of a hashing of the second certificate received from the second electronic device;
comparing information included in the second transaction with information included in the second certificate; and
registering the second transaction at the distributed ledger in response to the second result value and the fourth hash value coinciding and the information included in the second transaction and the information included in the second certificate coinciding.

15. The cryptographic communication method of claim 14, further comprising:
verifying an identity of the second electronic device by receiving the second certificate from the second electronic device,
obtaining the second transaction registered at the distributed ledger, and
performing a verification operation on the second transaction obtained from the distributed ledger and the second certificate received from the second electronic device.

16. The cryptographic communication method of claim 14, further comprising:
verifying an identity of the second electronic device by receiving the second certificate from the second electronic device,
looking up blocks stored in the first electronic device to obtain the second transaction, and
performing a verification operation on the second transaction obtained from the first electronic device and the second certificate received from the second electronic device.

17. The cryptographic communication method of claim 16, further comprising:
downloading blocks registered prior to the blocks from the distributed ledger in response to the second transaction not being obtained from the blocks stored in the first electronic device; and
looking up the blocks registered prior to the blocks to obtain the second transaction.

18. The cryptographic communication system of claim 1, wherein the node corresponds to a second electronic device.

19. The cryptographic communication system of claim 1, wherein the first hash value is generated based on a SHA256 hash.

20. The cryptographic communication system of claim 1, wherein the encryption corresponds to at least one of a Diffie-Hellman key exchange encryption, a RSA encryption, a Rabin encryption, an ElGamal encryption, a DSA encryption, or an elliptic-curve encryption.

* * * * *